(12) United States Patent
Siessegger et al.

(10) Patent No.: US 10,718,849 B2
(45) Date of Patent: Jul. 21, 2020

(54) WIRELESS BEACON-ENABLED LUMINAIRE IDENTIFICATION SYSTEM AND METHOD FOR DETERMINING THE POSITION OF A PORTABLE DEVICE

(71) Applicants: Osram Sylvania Inc., Wilmington, MA (US); Osram GmbH, Munich (DE)

(72) Inventors: Bernhard Siessegger, Unterschleissheim (DE); Christian Breuer, Dortmund (DE); Barry Stout, Beverly, MA (US); Anant Aggarwal, Waltham, MA (US)

(73) Assignees: OSRAM SYLVANIA Inc., Wilmington, MA (US); Osram GmbH, Munich (DE)

( * ) Notice: Subject to any disclaimer, the term of this patent is extended or adjusted under 35 U.S.C. 154(b) by 0 days.

(21) Appl. No.: 16/307,020

(22) PCT Filed: Jun. 20, 2017

(86) PCT No.: PCT/US2017/038208
§ 371 (c)(1),
(2) Date: Dec. 4, 2018

(87) PCT Pub. No.: WO2017/223008
PCT Pub. Date: Dec. 28, 2017

(65) Prior Publication Data
US 2019/0219662 A1 Jul. 18, 2019

Related U.S. Application Data

(60) Provisional application No. 62/352,591, filed on Jun. 21, 2016.

(51) Int. Cl.
*G01S 5/02* (2010.01)
*G01S 5/16* (2006.01)
(Continued)

(52) U.S. Cl.
CPC .......... *G01S 5/0263* (2013.01); *G01C 21/206* (2013.01); *G01S 5/16* (2013.01);
(Continued)

(58) Field of Classification Search
None
See application file for complete search history.

(56) References Cited

U.S. PATENT DOCUMENTS

2012/0172051 A1  7/2012  Jeong
2013/0141554 A1* 6/2013  Ganick .................... G01S 1/70
                                                              348/61

(Continued)

OTHER PUBLICATIONS

Caudevilla, Fanjul J., International Search Report and Written Opinion of the International Searching Authority, for counterpart application PCT/US2017/038208, dated Sep. 20, 2017, European Patent Office, Rijswijk, The Netherlands, 13 pages.

*Primary Examiner* — Christopher G Findley
(74) *Attorney, Agent, or Firm* — Yutian Ling

(57) ABSTRACT

Techniques for determining an actual position of a portable device are disclosed. In an embodiment, a two-tier triangulation and wireless beacon-enabled luminaire detection approach is implemented. An estimated position of a device is determined using wireless (e.g., wireless beacon) triangulation based on a signal parameter of a signal received from a wireless access point. The field of view of the portable device may be used to estimate positions of luminaires proximate the portable device. The actual position of the luminaires may be determined from the estimated position by querying a database. A second triangulation may be performed using the known position of the luminaires to determine the position of the portable device with respect to the actual position of the luminaire.

19 Claims, 13 Drawing Sheets

(51) Int. Cl.
*G06T 7/73* (2017.01)
*G06F 16/9537* (2019.01)
*G06F 16/29* (2019.01)
*G01C 21/20* (2006.01)

(52) U.S. Cl.
CPC .......... *G06F 16/29* (2019.01); *G06F 16/9537* (2019.01); *G06T 7/74* (2017.01); *G06T 2207/30244* (2013.01)

(56) References Cited

U.S. PATENT DOCUMENTS

2013/0331038 A1 12/2013 Kusakari
2015/0276399 A1 10/2015 Breuer et al.
2015/0377609 A1 12/2015 Shen et al.

\* cited by examiner

WIRELESS BEACON-ENABLED LUMINAIRE IDENTIFICATION SYSTEM AND METHOD FOR DETERMINING THE POSITION OF A PORTABLE DEVICE

CROSS REFERENCE TO RELATED APPLICATIONS

The present application is a National Stage application of, and claims priority, and the benefit of, International Application No. PCT/US2017/038208, filed on Jun. 20, 2017, entitled "WIRELESS BEACON-ENABLED LUMINAIRE IDENTIFICATION SYSTEM AND METHOD FOR DETERMINING THE POSITION OF A PORTABLE DEVICE" which claims priority, and the benefit of U.S. Provisional Patent Application No. 62/352,591, entitled "TWO-TIER TRIANGULATION AND WI-FI-ENABLED LUMINAIRE IDENTIFICATION," filed Jun. 21, 2016, which is hereby incorporated by reference in its entirety.

FIELD OF THE DISCLOSURE

The present disclosure relates to lighting systems, and more particularly, to techniques for using lighting systems to determine the position of objects in indoor environments.

BACKGROUND

Indoor positioning systems estimate the position of certain items, such as objects or people, in an indoor environment. Some indoor positioning systems utilize a known position of luminaires in the indoor environment to estimate the position of an item relative to one or more luminaires. Luminaires may transmit a unique identifier by modulating a light signal that it transmits. A receiver then decodes the modulated light signal and may identify the luminaire. This oftentimes requires specific modulation and decoding, along with specialized equipment.

DETAILED DESCRIPTION

Figure 1:
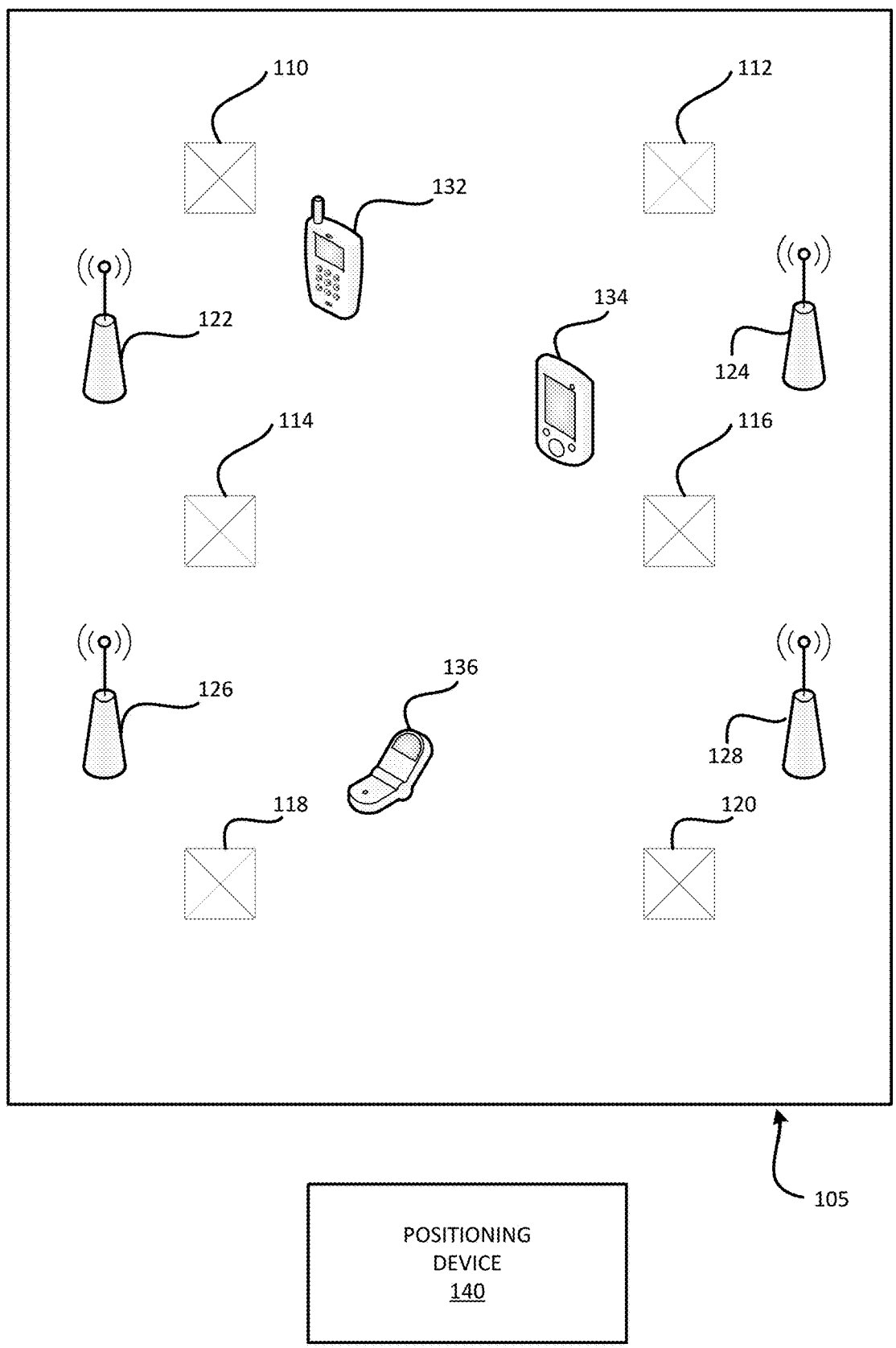
FIG. 1 illustrates a perspective view of an environment and an associated positioning device for determining a position of a portable device or another object within the environment in accordance with an example embodiment of the present disclosure.

Techniques for determining the position of an item, such as a portable device, another object, or an autonomous vehicle, are disclosed. The techniques may be implemented in any number of devices, such as smartphones, tablets, laptops, and other mobile computing devices, and other applications, such as autonomous vehicles, as will be appreciated in light of the present disclosure. According to an embodiment, a positioning system implements a two-tier approach to determine the position of a portable device in an indoor environment. The positioning system uses information received from a wireless signal to determine an estimated position of the portable device. For example, the positioning system may use a signal parameter of a signal received from a wireless beacon that communicates via a wireless communication network (such as a received signal strength indication (RSSI) of a Wi-Fi® network) to first determine an estimated position of the portable device. An identification of a specific wireless beacon that is transmitted in a wireless message, for example a radio frequency identification number, may be used to determine an estimated position of the portable device. The portable device also uses its field of view, for example of a camera, to capture an image of luminaires proximate the device to determine the second estimated position of the luminaires. The positioning system then queries a database for actual luminaire positions closest to the estimated positions of the luminaires. The actual positions of the luminaires are then used to triangulate an actual or otherwise relatively accurate position (e.g., within an acceptable tolerance) of the portable device. The positioning system may also implement a magnetic compass to determine orientation of the sensor in the portable device for further enhanced accuracy of position determination.

General Overview

Implementing a system that determines the position of objects, particularly in an indoor environment, involves a number of non-trivial issues. For example, some existing systems use visible light communication for luminaire identification. In visible light communication, luminaires transmit their locally unique identifier by modulating the light they emit, and a receiver device (e.g., smartphone) captures and decodes the modulated light signal to identify the luminaire. The modulation frequency of the light-based communication signal is sufficiently high, such that any resulting light flicker is not human-perceptible. However, in such a system, luminaires use a single step approach to locate objects in an environment. This may result in ambiguities and uncertainties as to at which position the object or portable device is located within the environment.

Thus, and in accordance with an embodiment of the present disclosure, a system is provided for determining the position of objects (e.g., a portable device) in an indoor environment by implementing a two-tier approach. In accordance with an embodiment of the present disclosure, the system implements the two-tier approach that first uses wireless access points (such as Wi-Fi® network access points or Bluetooth® beacons) to determine an approximate position of the portable device. Second, an estimated position of luminaires close to the device is determined using a sensor (such as a camera) and a database is queried for the actual luminaire position using the estimated position. In the two-tier approach, the estimation is more robust by first providing a coarse estimation of the location of the portable device, and also any potential ambiguities that could not be resolved with a single step position estimation are resolved by the two-tier approach. In an example embodiment of the present disclosure, almost any receiver may be used according to the two-tier approach, including both global and rolling shutter cameras as a receiver, and the system may readily be retrofitted as appropriate. The two-tier approach may implement any wireless communication system, such as Wi-Fi® or any other radio frequency (RF) enabled wireless communication system or network (such as Bluetooth®), in the first tier to determine an estimated position of the device, and then use the estimated position to query for an actual position of luminaires proximate the device. The two-tier approach may be used to determine the position of any object, such as a cell phone, smart phone, tablet, RF transceiver, laptop, or any other object in accordance with an example embodiment of the present disclosure. Depending on the specifications of the processor that performs the data processing, the method may be implemented locally in the positioning device—which actually might be a portable device—by utilizing a single or multiple-core microprocessor in accordance with an embodiment of the present disclosure. In some embodiments, the processor may be located in a local positioning and navigation server or it may be implemented as a virtual processor, for example, by applying cloud or other internet-based technology.

In accordance with a further two-tier approach, a plurality of wireless beacon-enabled luminaires is provided for determining the position of objects in an indoor environment. This two-tier approach using wireless beacon-enabled luminaires may be used instead of, in addition to, or in an alternate arrangement for redundancy, to the two-tier approach using luminaires and separate wireless beacons. The wireless beacon-enabled luminaires may be radio frequency (RF)-enabled, Bluetooth-enabled, or may be acoustic or an infrared (IR) transmitters.

System Architecture—Luminaires and Wireless Beacons

FIG. 1 illustrates a perspective view of an environment and an associated positioning device for determining a position of a portable device or another object within the environment, in accordance with an example embodiment of the present disclosure. In accordance with an embodiment, an environment 105, which may be a classroom, an office, a warehouse, etc., includes a plurality of luminaires 110, 112, 114, 116, 118 and 120. The luminaires may be any appropriate lighting fixture, such as a fluorescent or light emitting diode (LED) lighting fixture, and may be a flush mount fixture, a recessed fixture, or any other lighting fixture, as will be appreciated. The environment 105 also includes a plurality of wireless access points 122, 124, 126 and 128 which are access points to a wireless network, such as a Wi-Fi® access point, a Bluetooth® beacon, or any other appropriate wireless communication network access point. A plurality of portable devices are also in the environment 105, including a smart phone 132, a tablet 134 and a cell phone 136, in accordance with an example embodiment. Other portable devices may be in the environment 105, such as laptops, and wireless transceivers. Each portable device may include a wireless communication sensor capable of communicating with one or more of the wireless access points 122, 124, 126 and 128. Each portable device may also include a sensor, such as a camera, to identify one or more of the luminaires 110, 112, 114, 116, 118 and 120 that are proximate the portable device, for example by taking an image to identify the luminaires in the image.

A positioning device 140 is shown exterior of the environment 105 but may be included within the environment 105 in some embodiments. The positioning device 140 may be a separate computing device or the components of the positioning device 140 may be integrated into one or more of the portable devices. For example, the positioning device 140, although described as being a "device" may refer to an application executable on the portable device, so that the portable device becomes the positioning device and is able to determine the position internally within the portable device. In some embodiments, the positioning device may be an application or a web browser executing in a cloud or on a network-based server or storage element. In some embodiments, the positioning device could be considered a positioning service that is a program running on an embedded system, such as a micro controller or a smart phone, or other embedded software within a system. When the positioning device is cloud-based, the camera and optical sensor may be on the object to-be located, and provide the wireless communication data and the optical signal data to the cloud-based application or web browser for processing. It will be appreciated in light of the present disclosure that the terms "position" and "location" as used interchangeably herein and generally have the same meaning unless otherwise specified. In an embodiment, the positioning device 140 is coupled to, for example via wireless communication or by hard-wired communication, the wireless access points 122, 124, 126 and 128 and also to the portable devices 132, 134 and 136. The positioning device 140, as described in greater detail below, determines the position of portable devices within the environment 105 by leveraging the existing luminaires 110, 112, 114, 116, 118 and 120 and the wireless access points 122, 124, 126 and 128 in a two-tier approach that improves accuracy in determining position of portable devices as compared to wireless beacon-enabled or luminaire-enabled position determination alone.

Figure 2A:
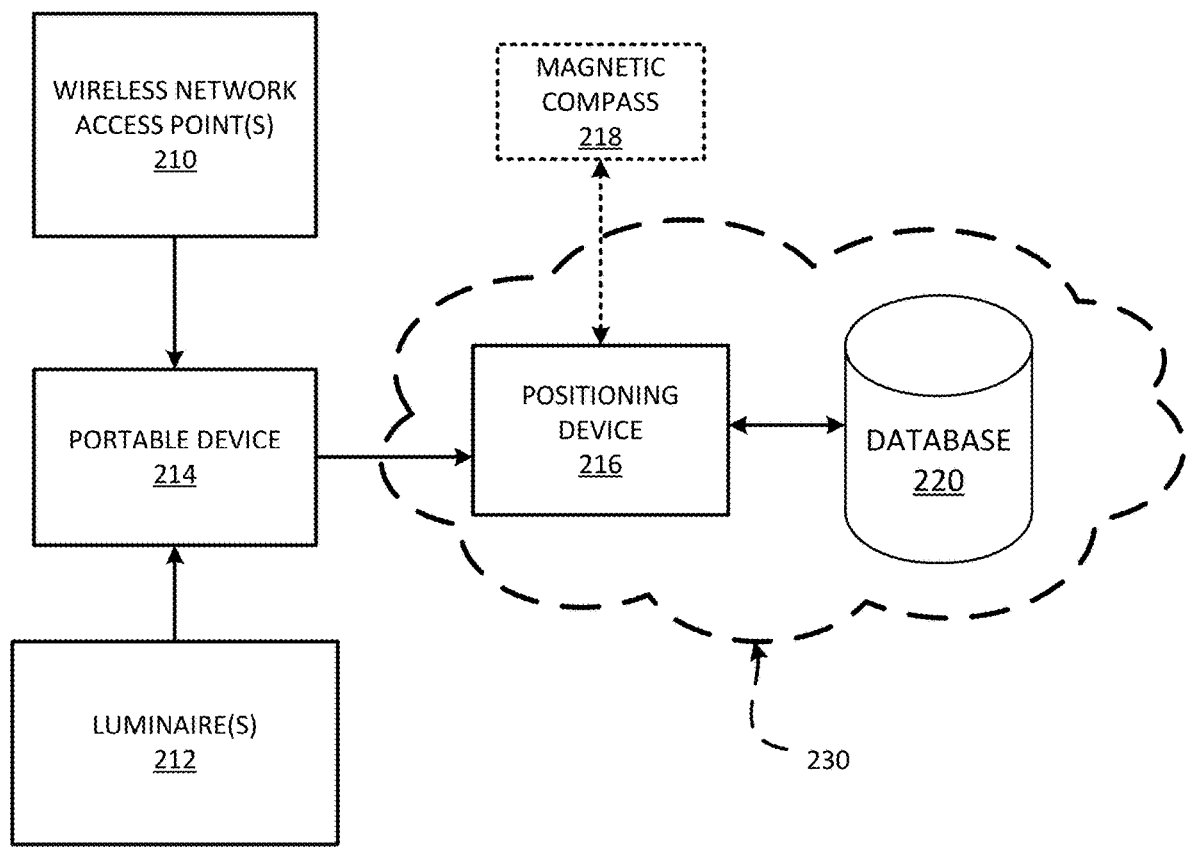
FIG. 2A illustrates a block diagram of components of a system for determining an actual position of a portable device in an environment, in accordance with an example embodiment of the present disclosure.
Figure 2B:
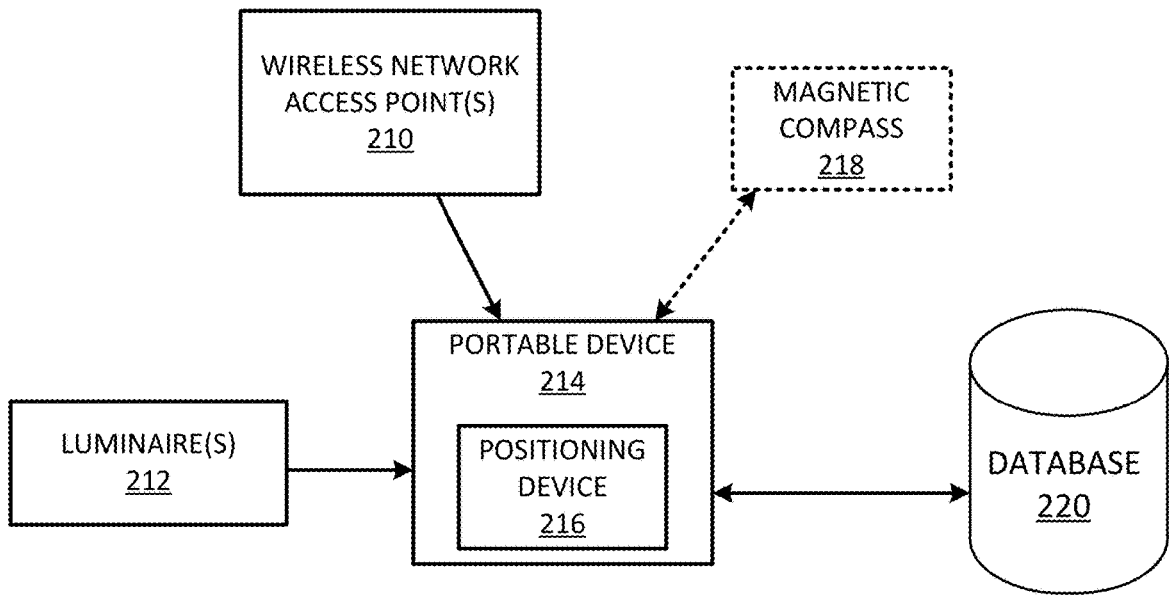
FIG. 2B illustrates a block diagram of components of a system or determining an actual position of a portable device in an environment, in which a positioning device is within the portable device, in accordance with an example embodiment of the present disclosure.
Figure 2C:
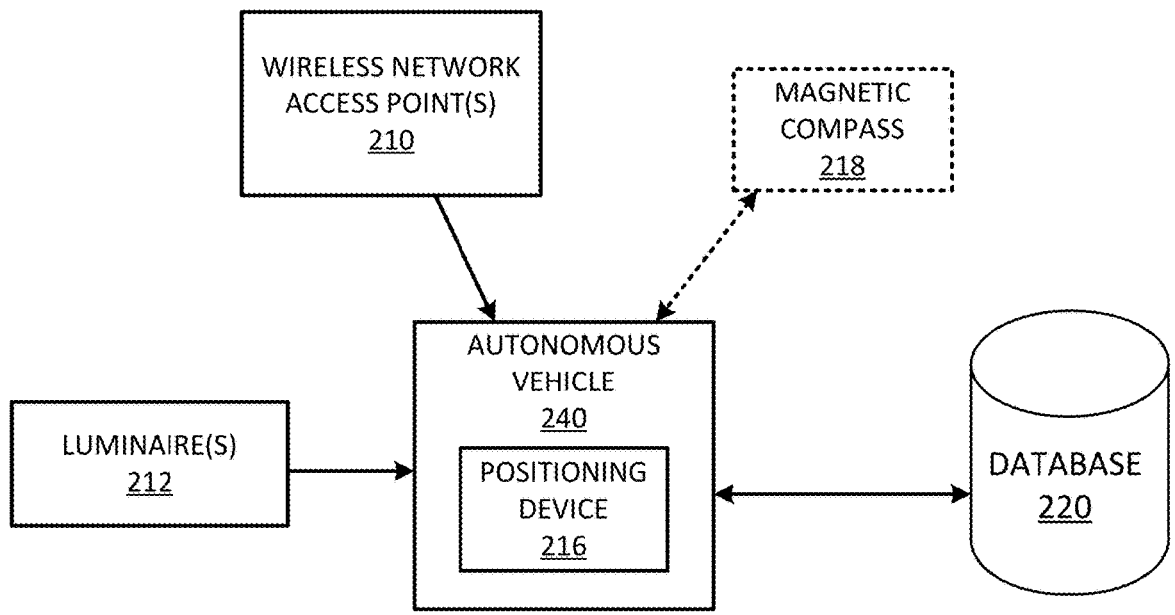
FIG. 2C illustrates a block diagram of components of a system for determining an actual position of an autonomous vehicle in an environment, in which the positioning device is within the autonomous vehicle, in accordance with an example embodiment of the present disclosure.

Reference is now made to FIGS. 2A, 2B, and 2C, showing example arrangements of the system for identifying luminaires in an environment and determining a position of an object, such as a portable device, in the environment. It will be appreciated in light of the present disclosure that other arrangements may be provided. In FIG. 2A, the positioning device is shown separated from the portable device, and the positioning device is a network-based service, in accordance with an example embodiment. In FIG. 2B, the positioning device is shown within the portable device, and in FIG. 2C the positioning device is within an autonomous vehicle, in accordance with example embodiments of the present disclosure.

FIG. 2A illustrates a block diagram of components of a system for determining an actual position of a portable device in an environment, in accordance with an example embodiment of the present disclosure. A plurality of wireless beacons 210 and a plurality of luminaires 212 provide data to the portable device 214, and the portable device 214 provides the information to a positioning device 216 so that the positioning device may determine the location of the portable device 214 within the environment. The positioning device 216 queries a database 220 to determine the actual position of the luminaires 212, which is used to determine the position of the portable device 214. The positioning device 216 may also receive information from a magnetic compass 218 on the portable device 214. The positioning device 216 and database 220 may be part of a network 230, such as a cloud-based service, such that the information provided to the portable device may be transmitted wirelessly to the positioning device 216 to determine the actual position of the portable device 214. It will be appreciated in light of the present disclosure that this is only one example arrangement, and in some embodiments the positioning device 216 may be included within the portable device 214 and perform the calculations within the portable device 214. In other embodiments, the positioning device 216 may be stored as an application running on the portable device 214, and the information may be sent through the application running on the portable device 214 to a network based service to perform the triangulation and position determination, in accordance with one or more embodiments of the present disclosure.

Data from communication with one or more wireless network access point(s) 210 and data regarding one or more luminaire(s) 212 are received at a portable device 214. The data from communication with one or more wireless network access points 210 may include a signal parameter of the signal received from the wireless network access point, such as a received signal strength indicator (RSSI), an Angle of Arrival (AoA), a Time of Flight (ToF), or another signal parameter using RF waves, magnetic fields, acoustic signals, or other sensory information collectable by portable devices. The signal parameter of the signal may be used to determine a distance between the portable device 214 and the access point 210, to thereby provide an approximate position of the portable device 214. The data regarding the luminaires 212 may include an image of the field of view of the portable device 214. The image may be used to provide an estimated position of a luminaire 212 with respect to the portable device 214.

The portable device 214 may be any one of the portable devices 132, 134 or 136 shown in FIG. 1, or may be another portable device, and the wireless access point 210 may likewise be any one of the access points 122, 124, 126 or 128 shown in FIG. 1, or another access point, and the luminaire 212 may likewise be any one of the luminaires 110, 112, 114, 116, 118 or 120 shown in FIG. 1, or another luminaire, in accordance with an embodiment of the present disclosure. The portable device 214 may include a radio frequency (RF) transceiver with a RF receiver and a photodiode and the wireless signal and optical signal are passed wirelessly, for example, to the positioning device, in accordance with an embodiment of the present disclosure.

A positioning device 216 receives the signal parameter and the estimated position of the luminaire from the portable device 214. For example, the positioning device 216 may communicate with the portable device 214 over a wireless network to receive the signal parameter and the estimated position of the luminaire(s) 212 from the portable device 214. In another example, the positioning device 216 may be integrated into the portable device 214, in which case the portable device 214 and the positioning device 216 would be a single component that performs the functions of the portable device 214 and the positioning device 216. In some embodiments, a magnetic compass 218, or other similar positional sensor, is included in the portable device 214. The magnetic compass 218 may provide a global orientation of the portable device 214, which may be used by the positioning device 216 to determine the position of the portable device 214 in the environment. For example, the magnetic compass or other additional sensor may provide information about which direction the device (and, thus, the imaging sensor) is facing. The orientation information may be used with the position information from one or more luminaires to determine the position of the portable device in the environment, without using three land marks as typically needed in performing a distance-based triangulation. Thus, if only one luminaire is visible in the field of view of the portable device, if the orientation information of the portable device is also known from a magnetic compass the position may still be determined. Other positional sensors, such as an accelerometer tracking motion, may be used to provide an estimated orientation for the portable device 214.

The positioning device 216 uses the estimated position of the luminaire, the signal parameter, and/or orientation information of the portable device to query a database 220 for the actual position of the luminaire. As described in greater detail herein, the actual position of the luminaire and the signal parameter indicating approximate position of the portable computing device may be used together to determine the position of the portable device in an environment, in accordance with an example embodiment of the present disclosure.

The positioning device 216 implements a two-tier triangulation approach and wireless beacon-enabled luminaire identification to determining the position of a portable device in an environment. First, a wireless beacon-based triangulation technique (such as a Wi-Fi® triangulation) is used for coarse positioning of the portable device, and a second luminaire-enabled triangulation is performed to precisely determine a position of the portable device. In order for a position of a sensor to be triangulated (either by the portable device 214 or by the positioning device 216), using one or more luminaires, the absolute position of the luminaires is retrieved from a database 220. The positioning device 216 may take advantage of the coarse position estimation from the wireless beacon-enabled triangulation. In the case where the portable device 214 includes an orientation sensor, such as a magnetic compass 218, the positioning device 216 has knowledge of the global orientation of the sensor. Thus, by knowing the direction the imaging sensor is facing, even a single luminaire in a field of view of a sensor may be used to determine the position of a portable device when an additional orientation sensor is present.

It will be appreciated in light of the present disclosure that the positioning device 216 may be separated from the portable device 214, for example in a cloud as shown in FIG. 2A. In some embodiments, the positioning device 216 may be included in the portable device 214, or within another object such as an autonomous vehicle that moves independently within an environment, as shown, respectively, in FIG. 2B and FIG. 2C.

FIG. 2B illustrates a block diagram of components of a system or determining an actual position of a portable device in an environment, in which a positioning device is within the portable device, in accordance with an example embodiment of the present disclosure. The positioning device 216 is shown included within the portable device 214, and the portable device itself is in communication with the wireless access points 210, the luminaires 212, and the database 220. In accordance with the example embodiment, the portable device 214 receives the wireless signal from the wireless beacons 210, receives the optical signal from the luminaires 212, and queries the database 220 for appropriate data to determine the actual position of the portable device in the environment.

FIG. 2C illustrates a block diagram of components of a system for determining an actual position of an autonomous vehicle in an environment, in which the positioning device is within the autonomous vehicle, in accordance with an example embodiment of the present disclosure. The positioning device 216 is shown included within an autonomous vehicle 240, and the autonomous vehicle 240 itself is in communication with the wireless access points 210, the luminaires 212, and the database 220. In accordance with the example embodiment, the autonomous vehicle 240 receives the wireless signal from the wireless beacons 210, receives the optical signal from the luminaires 212, and queries the database 220 for appropriate data to determine the actual position of the portable device in the environment. This may allow an autonomous vehicle to be able to move within an environment, and use the wireless access points and luminaires to locate itself within the environment and move accordingly. The autonomous vehicle 240 may thus be fully-contained and not require a separate positioning device or other control unit to determine the position of the autonomous vehicle 240 within the environment. The autonomous vehicle 240 may determine its own position using a simple wireless receiver, such as a Bluetooth® receiver, and optical receiver, such as a photodiode. The autonomous vehicle 240 may use infrared light to communicate via the wireless receiver, and use optical light to communicate with the luminaire. For example, the autonomous vehicle 240 may measure the received signal strength of the infrared light signal, and that may be used to provide the first coarse estimation of position. Other features of the autonomous vehicle 240 will be apparent in light of the present disclosure.

In accordance with an embodiment of the present disclosure, a wireless beacon-enabled indoor positioning system is able to determine an estimated position of a portable device using a signal parameter of the wireless beacon-based system. For example, a signal parameter may include one or more of a RSSI, AoA, ToF, or any other signal parameter using wireless beacon waves, magnetic fields, acoustic signals or other sensory information collected by the portable device(s).

In an embodiment, a wireless beacon-enabled positioning system may determine the estimated position of the portable device based on, for example, measuring the intensity of the RSSI. Other positioning techniques may be used to determine the estimated position of the portable device in the first tier of the two-tier approach, in accordance with an example embodiment. In another example, the first tier techniques may include Bluetooth, fingerprinting, Angle of Arrival, Time of Flight, among others, as will be appreciated.

By measuring the angles under which the imaging sensor sees the luminaires (for example, the angle at which the imaging sensor receives a light signal from the luminaire), the positioning device 216 may estimate the position of a luminaire in the field of view of the portable device 214. Then, the system may query a database 220 to retrieve actual positions of luminaires that are closest to the estimated positions of the luminaires. Instead of using an identifier when querying the database 220 for position (as done in visible light communication-based techniques), the positioning device of the present disclosure uses estimated positions to identify the luminaires in the database.

In some embodiments, a distance between the luminaires may be smaller than the location accuracy provided by the wireless beacon-enabled triangulation in the first tier of the two-tier triangulation. In some such embodiments, the positioning device may query the database for all luminaires that are in the field of view of the imaging sensor. With the position of all luminaires, the positioning device may vary its own position estimation until it finds the best match between what is in the field of view of the imaging sensor of the portable device and what an image should look like from that position based on the known positions in the database (i.e., what the image should "look" like from that position). It should be clear that "image" may be an image, or in some instances may refer to the angles under which the portable device "sees" the luminaires (i.e., the angle under which the luminaires are visible in the field of view of the portable device). The approach for determining position by varying position estimation until a best match is found may be referred to as an optimization approach.

In other embodiments, there may not be a sensor that provides orientation information, and the optimization approach may not result in a non-ambiguous solution. In such other embodiments, the positioning device may estimate its coarse orientation by keeping track of its motion or a motion history, for example with an accelerometer. Using a known orientation or position combined with the motion history or other motion data, a coarse orientation may be determined.

Figure 3:
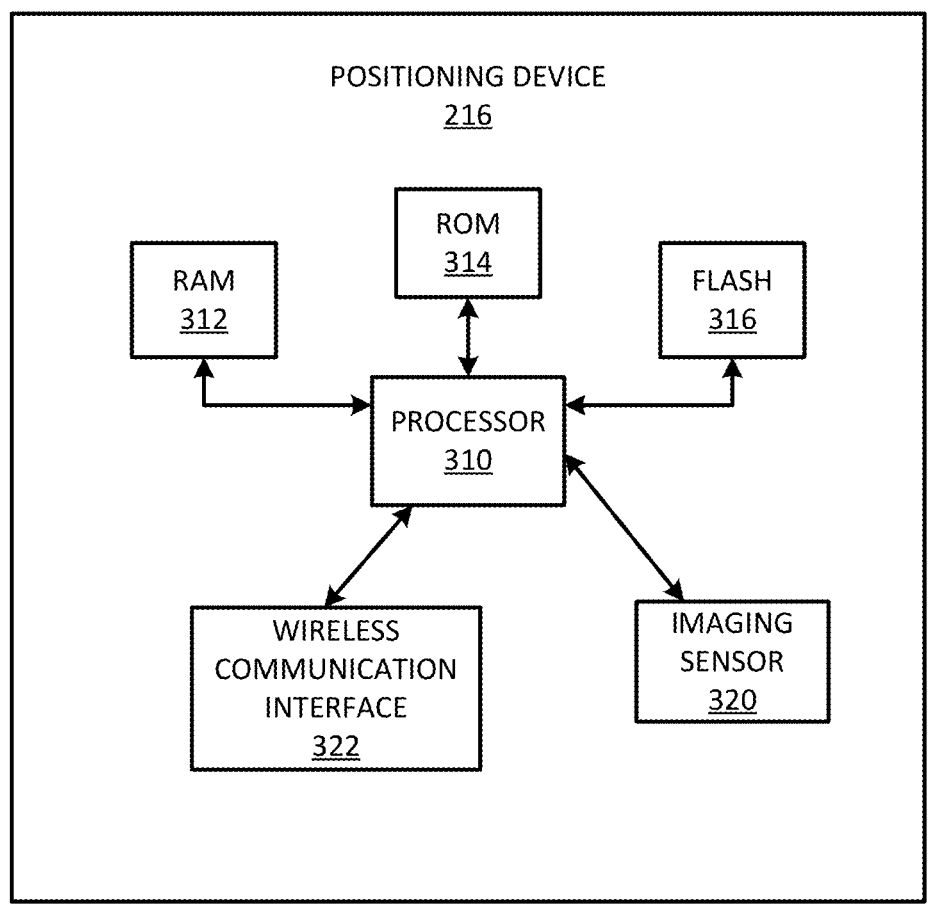
FIG. 3 illustrates a block diagram of a positioning device for determining an actual position of a portable device in an environment, in accordance with an example embodiment of the present disclosure.

FIG. 3 illustrates a block diagram of a positioning device for determining an actual position of a portable device in an environment, in accordance with an example embodiment of the present disclosure. The positioning device 216 includes a processor 310, RAM (volatile random access memory) 312, ROM (read-only memory) 314, FLASH memory (non-volatile memory) 316, an imaging sensor 320 and a wireless communication interface 322. In some embodiments, the positioning device 216 may be integrated into one or more of the portable devices in the environment, and may use some existing components of the portable device, or may be a separate stand-alone device within or outside of the environment.

The positioning device 216 includes different types of memory for carrying out different processes within the positioning device, including but not limited to RAM 312, ROM 314 and FLASH memory 316. The RAM 312 may by any volatile memory and the ROM 314 may be any nonvolatile memory in accordance with an embodiment. The processor 310 is coupled to the RAM 312, ROM 314 and FLASH memory 316. The ROM 314 may have instructions for carrying out the two-tier positioning technique stored thereon. The FLASH memory 316 may be used to interface with a universal port, such as a universal serial bus (USB) port of the positioning device. Note that although specific types of nonvolatile memory locations (i.e. FLASH memory and ROM) are disclosed, other types of nonvolatile memory facilities may be implemented, and likewise although specific types of volatile memory locations are disclosed (i.e., RAM), any appropriate volatile memory may be implemented.

In some embodiments, the positioning device 216 may include an imaging sensor 320, such as a camera. In some embodiments in which the positioning device 216 is included in the portable device, the imaging sensor 320 may be an existing camera of the portable device. In some embodiments, the imaging sensor may include a front- and/or rear-facing camera. In some embodiments, the imaging sensor 320 may be used to communicate with the luminaires or other components in the environment. In some embodiments, the positioning device 216 does not include imaging sensor 320.

In accordance with an example embodiment of the present disclosure, the positioning device 216 includes a wireless communication interface 322 that enables wireless communications for the transfer of data to and from the positioning device 216. The wireless communication interface 322 is configured to communicate with the portable devices and, in some cases, the wireless access points. The wireless communication interface 322 obtains data from portable devices via appropriate communication, such as Wi-Fi®, Bluetooth®, etc. The term "wireless" and its derivatives may be used to describe circuits, devices, systems, methods, techniques, communication channels, etc., that may communicate data through the use of modulated electromagnetic radiation through a non-solid medium. The term does not require that the associated devices do not contain any wires. In some embodiments, the devices may include wires and be considered to use wireless devices, whereas other embodiments may not include wires. The wireless communication interface 322 may implement any of a number of wireless standards or protocols, as will be appreciated. The wireless communication interface 322 may include an appropriate wireless communication receiver and transmitter, for receiving and transmitting the wireless signals.

It will be appreciated that fewer or additional components may be included in the positioning device 216, depending upon the environment and the type of positioning determination that is desired.

Figure 4:
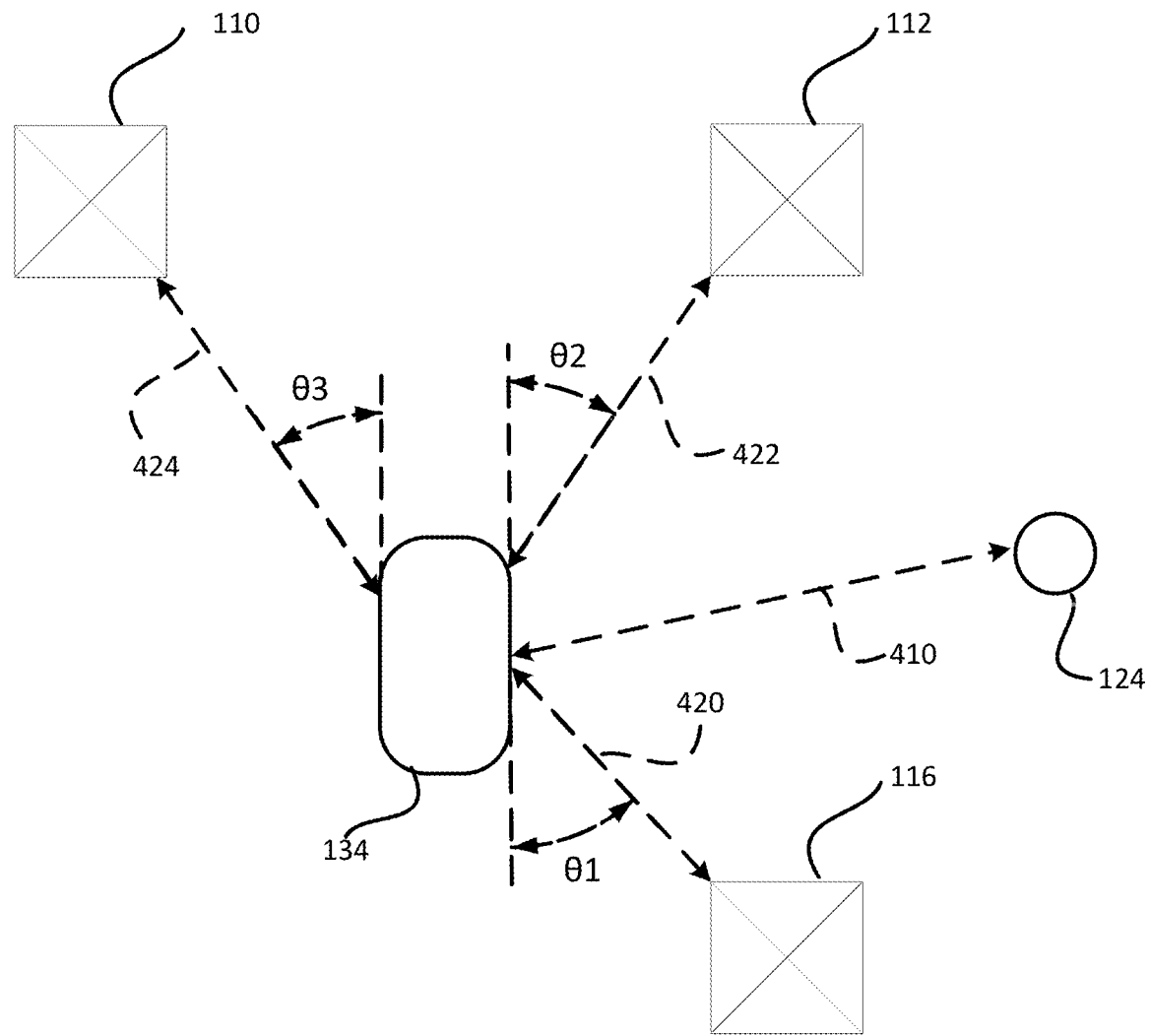
FIG. 4 illustrates a perspective view of a portable device shown with respect to three luminaires and one wireless access point, in accordance with an example embodiment of the present disclosure.

FIG. 4 illustrates a top view of a portable device 134 shown with respect to three luminaires and one wireless access point, in accordance with an example embodiment of the present disclosure. The absolute position of the portable device 134 is determined by a positioning device using the wireless access point and the three luminaires proximate the portable device. These luminaires 110, 112, and 116 may be the luminaires shown in the environment 105 of FIG. 1, and the wireless beacon 124 and the portable device 134 may also be the same as those shown in the environment 105 of FIG. 1, although other arrangements of luminaires and wireless beacons are likewise applicable to the techniques of the present disclosure. The angles at which the signals are received (i.e., the angle at which the luminaire is visible in the field of view of the optical receiver of the device) may be measured given the actual position of the luminaires, as determined from a database query.

In accordance with an example embodiment, the luminaires 110, 112 and 116 and wireless access point 124 are used to determine position of the portable device 134. The positioning device (for example 140, not shown in FIG. 4) computes a coarse location estimation using a wireless beacon-based triangulation based on a parameter of a signal 410 received from the wireless access point 124, which may be a Wireless Local Area Network (WLAN) hotspot, Bluetooth beacon, ZigBee®, etc. The luminaires proximate the portable device are searched for in the field of view of the portable device. Given the first location estimate, the positioning device may query a database for the actual position of the luminaires in the field of view of the portable device. Given the actual position of the luminaires 116, 112 and 110, the angles $\theta1$, $\theta2$ and $\theta3$ under which the luminaires 116, 112 and 110, respectively, are visible in the field of view of the portable device 134 (shown, respectively by arrows 420, 422 and 424) may be measured. The known angles and the known position of the luminaires provide highly accurate position determination of the portable device in an indoor environment, without requiring complex devices or modulation and decoding of light signals. Measuring the angles ($\theta1$, $\theta2$ and $\theta3$) of multiple luminaires combined with the knowledge of the luminaires' absolute positions allows triangulation that is significantly improved over either approach of a wireless beacon-enabled triangulation positioning system or a luminaire-only positioning system. The positioning device is thus able to determine the position of the portable device 134, in accordance with an example embodiment.

Methodology—Luminaires and Wireless Beacons

Figure 5:
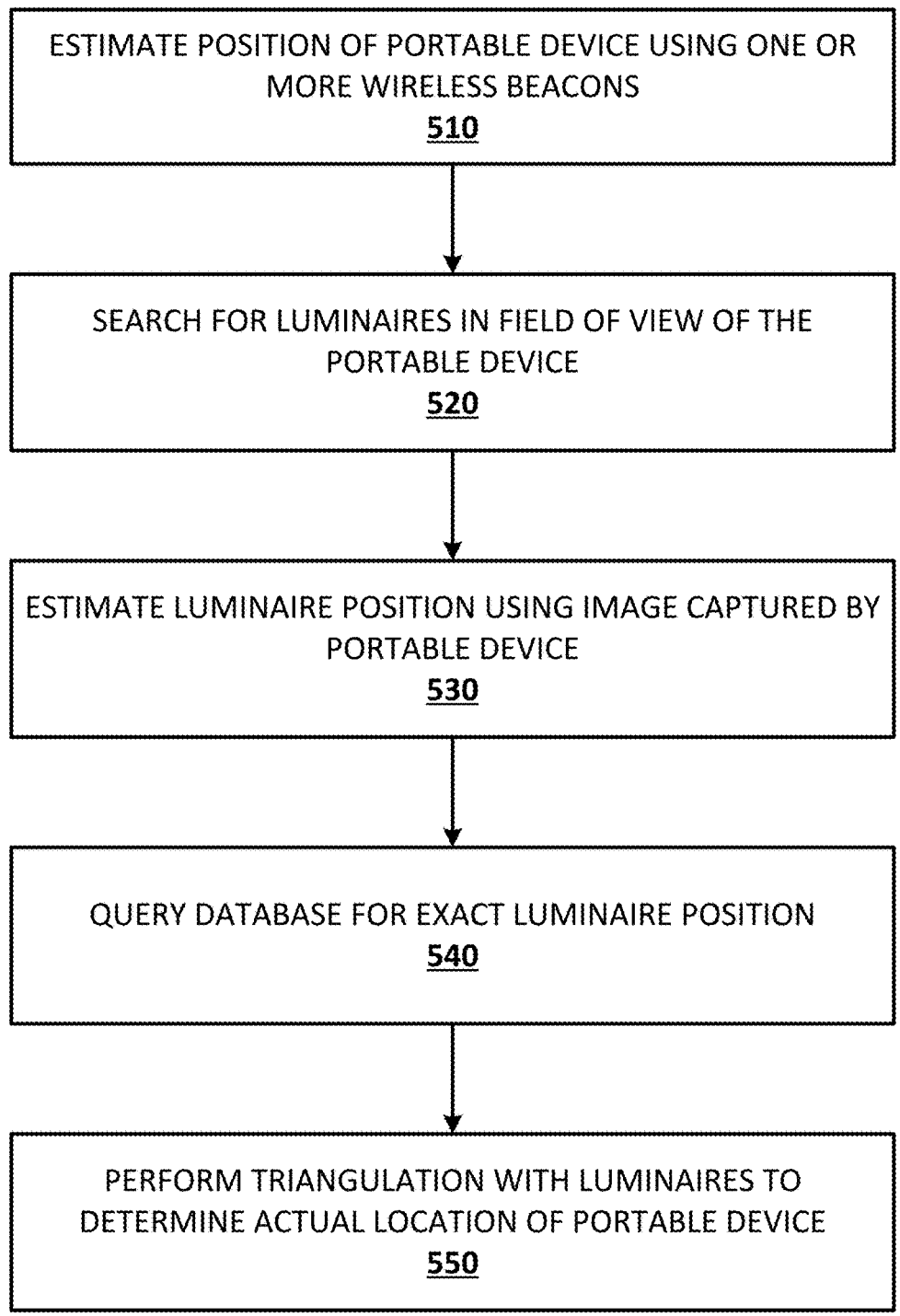
FIG. 5 illustrates a two-tier positioning methodology for determining an actual position of a portable device in an environment, in accordance with an example embodiment of the present disclosure.

FIG. 5 illustrates a methodology for determining an actual position of a portable device in an environment, in accordance with an example embodiment of the present disclosure. The method may be carried out, for example, by a portable device and/or a positioning device as shown in any of the embodiments of FIGS. 1-4, although any number of other configurations will be apparent in light of the present disclosure. The method allows a position of a portable device to be determined without specialized luminaires and receivers, while providing highly accurate position determination.

A position of the portable device in an environment is estimated at block 510 using one or more wireless network access points. For example, a signal parameter of a signal received at the portable device from the wireless network access point (such as RSSI) may be used to provide an estimated position of the portable device. At block 520, the portable device searches for luminaires in the field of view of the portable device via an image of the field of view. For example, the portable device captures an image or uses the camera on the portable device to search its field of view, in accordance with an example embodiment of the present disclosure.

In block 530, an estimated position of luminaires proximate the portable device is determined using the image captured by the portable device and the estimated position of the portable device. Using the estimated position of luminaires, a database is queried at block 540 to determine the exact luminaire position. Instead of using an identifier (for example, provided by receiving a modulated light signal in visible light communication-based systems), the two-tier positioning system of the example embodiment of FIG. 5 uses an estimated position to identify the luminaire in the database. The database knows the exact luminaire position which may be determined from the estimated position of the luminaire. In some instances, the database query may not return any luminaire within a certain radius ("confidence radius") of the triangulation. In some such instances, the system may default to the position estimated by the wireless beacon-enabled triangulation. In some such cases, the system may default to the last good known position, which may be augmented with motion tracking information, for example from inertial sensors of the portable device, such as wheel sensors, accelerometers, or gyrometers.

At block 550, a triangulation is performed using the exact luminaire position to determine an actual position of a portable device. Typically three or more known land marks are used for proper triangulation to determine the position of an object. Accordingly, it is desirable for three luminaires to be visible to the portable device to determine the position of the portable device. In some cases, the triangulation may still be performed with two or even one luminaire to still determine the position of the portable device. For example, the first estimation using Wi-Fi® or another wireless beacon-enabled triangulation technique may provide additional information such as the height of the sensor above the ground, and thus luminaire-enabled triangulation may also be performed using two luminaires within the field of view of the portable device. The sensor height estimation may be further improved by looking-up the ground height in a building map. The ground height is readily available from the building map given the coarse position estimation from the Wi-Fi® or other wireless beacon-enabled triangulation. In another example, additional sensors may be used, such as a magnetic compass on the portable device, to determine an orientation, e.g., which direction an imaging sensor is facing. If this orientation information is available, a single luminaire in the field of view of the portable device may be used to determine the position of the portable device with improved accuracy as compared to a pure Wi-Fi® triangulation technique.

Figure 6:
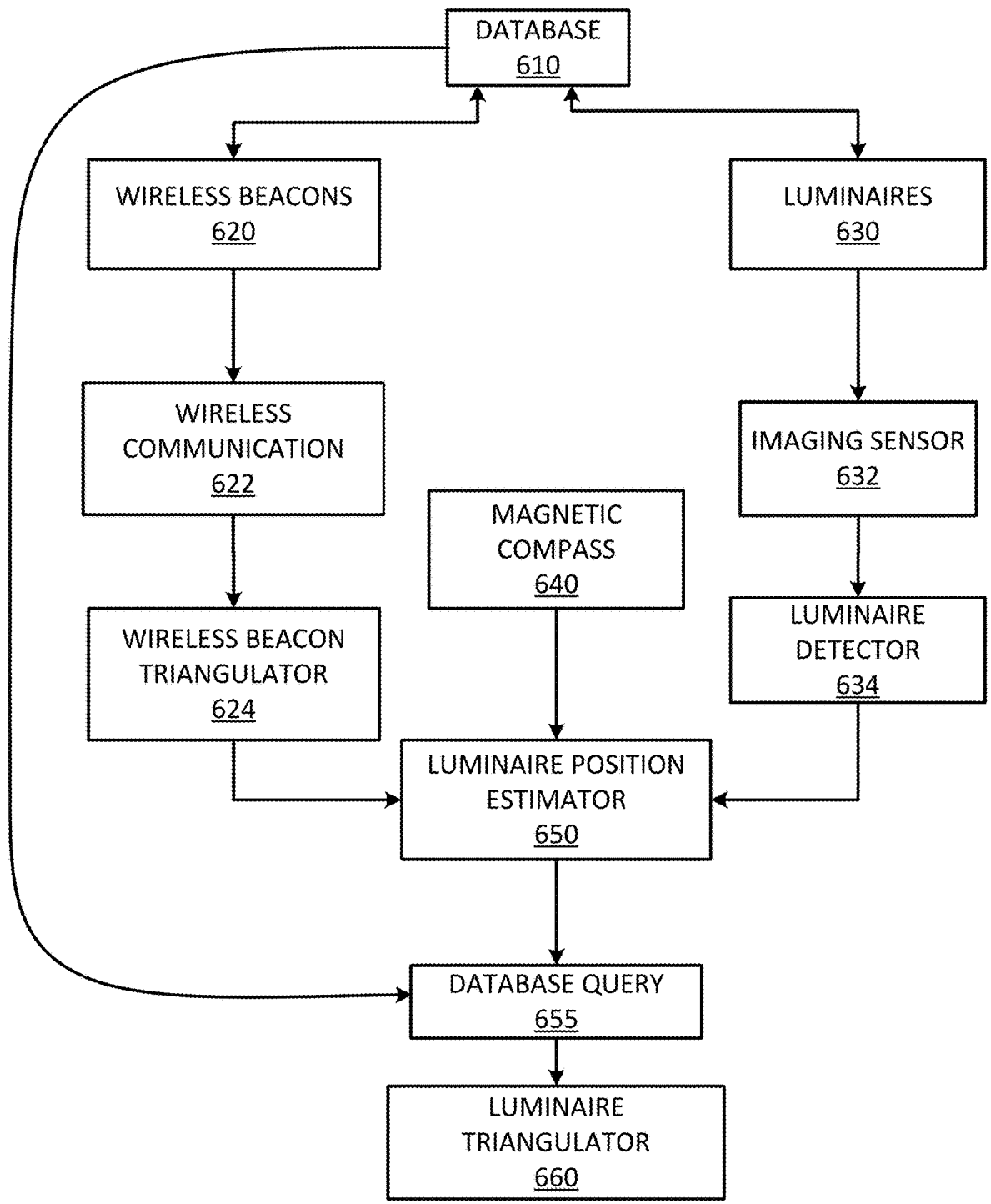
FIG. 6 illustrates a detailed flow diagram of a two-tier positioning system methodology, in accordance with an example embodiment of the present disclosure.

FIG. 6 illustrates a detailed block diagram of a two-tier positioning system methodology, in accordance with an example embodiment of the present disclosure. The method may be carried out, for example, by any of the embodiments shown in FIGS. 1-4, although any number of other configurations will be apparent in light of the present disclosure. The method allows a position of a portable device to be determined without specialized luminaires and receivers, while providing highly accurate position determination.

The positioning system includes a plurality of luminaires and a plurality of wireless access points, in accordance with an embodiment of the present disclosure. The flow through the various components of the positioning system is shown in FIG. 6. A database 610 includes information identifying the actual position of the luminaires, for example in a global coordinate system, and may also include a building map, such as a three-dimensional (3D) map, which may include floor level information, luminaire positions, and other information concerning the environment in which the luminaires, wireless access points, and positioning device is located. The database 610 may be the database 220 of FIG. 2, in an example embodiment. The building map may include the absolute positions of wireless access points 620 (e.g., 122, 124, 126, 128 shown in FIG. 1) and luminaires 630 (e.g., 110, 112, 114, 116, 118, 129 shown in FIG. 1). The wireless access points 620 send their positions and RSSI over a wireless beacon radio interface 622. The RSSI and positions are received at and used by a wireless beacon triangulator 624, which may be part of the portable device (e.g., portable device 132, 134 or 136) or part of the positioning device (e.g., positioning device 140 or 216) in accordance with an example embodiment. For example, the wireless beacon triangulation may be part of the portable device when the positioning system is within the portable device, or may be separate device from the portable device.

A coarse position estimate of the portable device is sent to the positioning device and used at the luminaire position estimator 650 to estimate the luminaire position. As described herein, the estimated luminaire position is used to retrieve the actual luminaire position from a database. The actual luminaire position is then used to determine the position of the portable device in the environment with respect to the actual luminaire position.

The luminaires 630 send a light signal which is received at an imaging sensor 632 of the device (e.g., portable device 132, 134 or 136). An image may be captured having multiple luminaires in the field of view of the portable device, in accordance with an example embodiment of the present disclosure. In some embodiments, positional data other than an image is used for identifying multiple luminaires proximate a portable device. A luminaire detector 634, which may be part of the portable device or part of the positioning device, receives the image captured by the imaging sensor, and determines the luminaire angles, which are provided to the luminaire position estimator 650 of the positioning device.

In some embodiments, a magnetic compass 640, or other orientation-based sensor, may be used to provide coarse orientation information to the luminaire position estimator 650, as will be appreciated in light of the present disclosure. The orientation information may be used to determine which direction that imaging sensor is facing, which may allow a single luminaire in the field of view of the portable device to determine position of the portable device, without requiring three landmarks (or reference points) as required with a single-tier triangulation or other indoor positioning technique having a single stage of position determination, as will be appreciated in light of the present disclosure.

The luminaire position estimator 650 uses the coarse position estimate from the wireless network communication-enabled triangulation 624 and the luminaire angles from the luminaire detector 634 to estimate the position of multiple luminaires. A database query 655 is performed using the estimated position of the multiple luminaires. The actual luminaire positions are determined from the database query, and a luminaire triangulator 660, using the luminaire angles and the actual luminaire positions, determines the accurate position and orientation of the portable devices, in accordance with an example embodiment of the present disclosure.

System Architecture—Luminaires with Integrated Wireless Beacons

In accordance with an embodiment of the present disclosure, luminaires with integrated wireless beacons may be used to identify luminaires proximate a portable device, and determine the actual position of the portable device. This technique may be used in addition to, instead of, or in the alternative as a fail-safe to provide dual-identification, in which both luminaires with integrated wireless beacons and existing, standalone wireless beacons may be used together. It will be appreciated in light of the present disclosure that the terms "position" and "location" are used interchangeably herein and generally have the same meaning unless specified otherwise.

Figure 7:
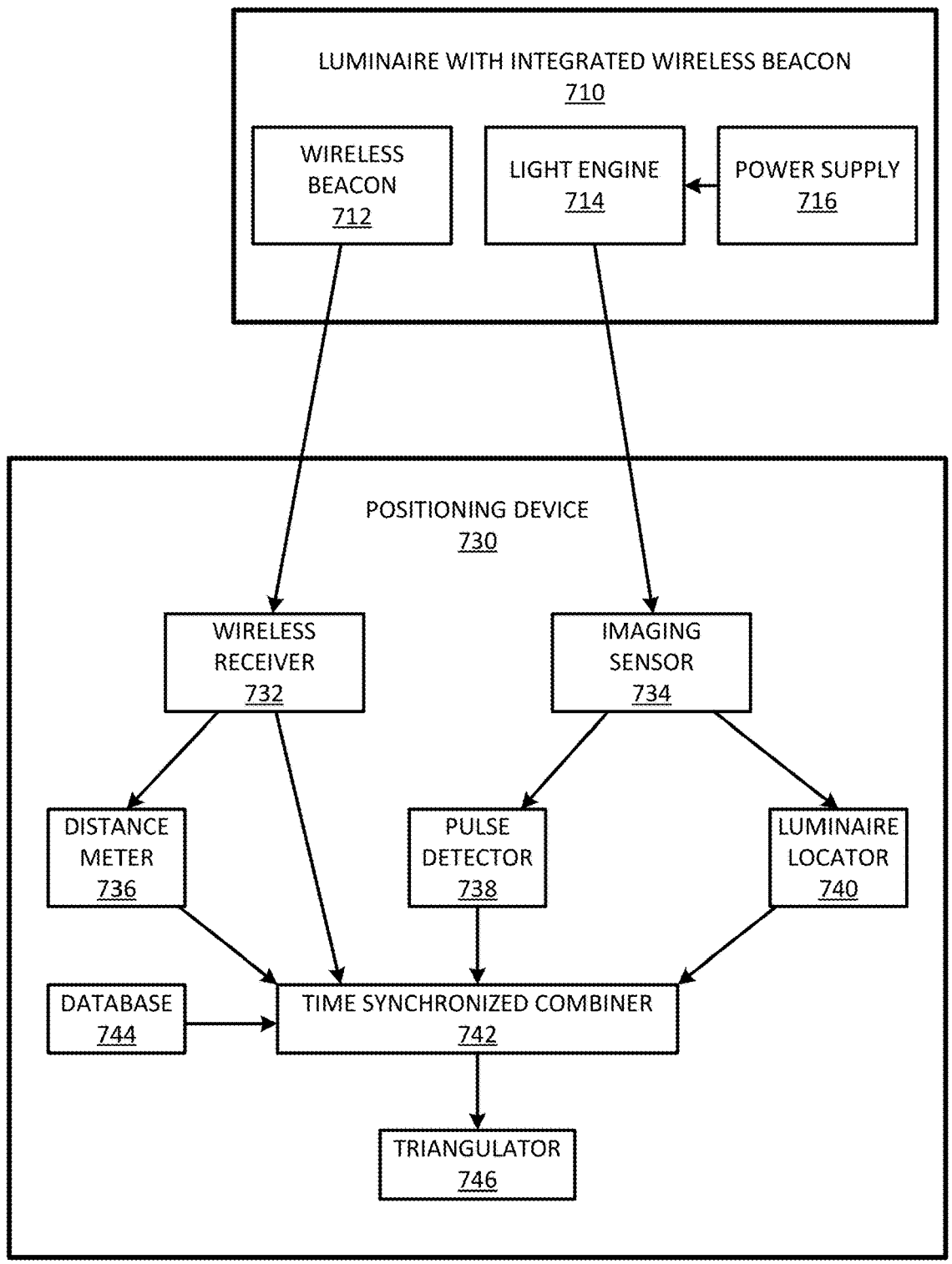
FIG. 7 illustrates a block diagram of components of a system for determining an actual position of a portable device in an environment, using luminaires with integrated wireless beacons, in accordance with an example embodiment of the present disclosure.

FIG. 7 illustrates a block diagram of components of a system for determining an actual position of a portable device in an environment, using luminaires with integrated wireless beacons, in accordance with an example embodiment of the present disclosure. Each luminaire has an integrated wireless beacon configured to transmit the luminaire identifier, in accordance with an example embodiment. Although described as determining the position of a "positioning device," it will be appreciated in light of the present disclosure that it may be the portable device itself, which may include the components of the positioning device within the portable device, or any other arrangement disclosed herein. For example, the positioning device may be part of the portable device, or the components may be otherwise electrically and/or optically coupled to form a positioning device.

With reference to FIG. 7, a block diagram of the positioning system is shown, including the luminaire 710 with integrated wireless beacon and the positioning device 730. It will be appreciated in light of the present disclosure that the positioning device 730 may be a separate, network-based device or service that receives data from a portable device, or may be contained within a portable device, in accordance with the techniques of the present disclosure. It will also be appreciated that, although the absolute position of the positioning device is described, the positioning system may determine the position of an object or other portable device. The portable device may include the wireless receiver and imaging sensor. In some embodiments, the processing may be performed by the positioning system, whether it is internal to the positioning device or external to it (e.g., in a cloud-based or server-based embodiment), as will be appreciated in light of the present disclosure.

Figure 11:
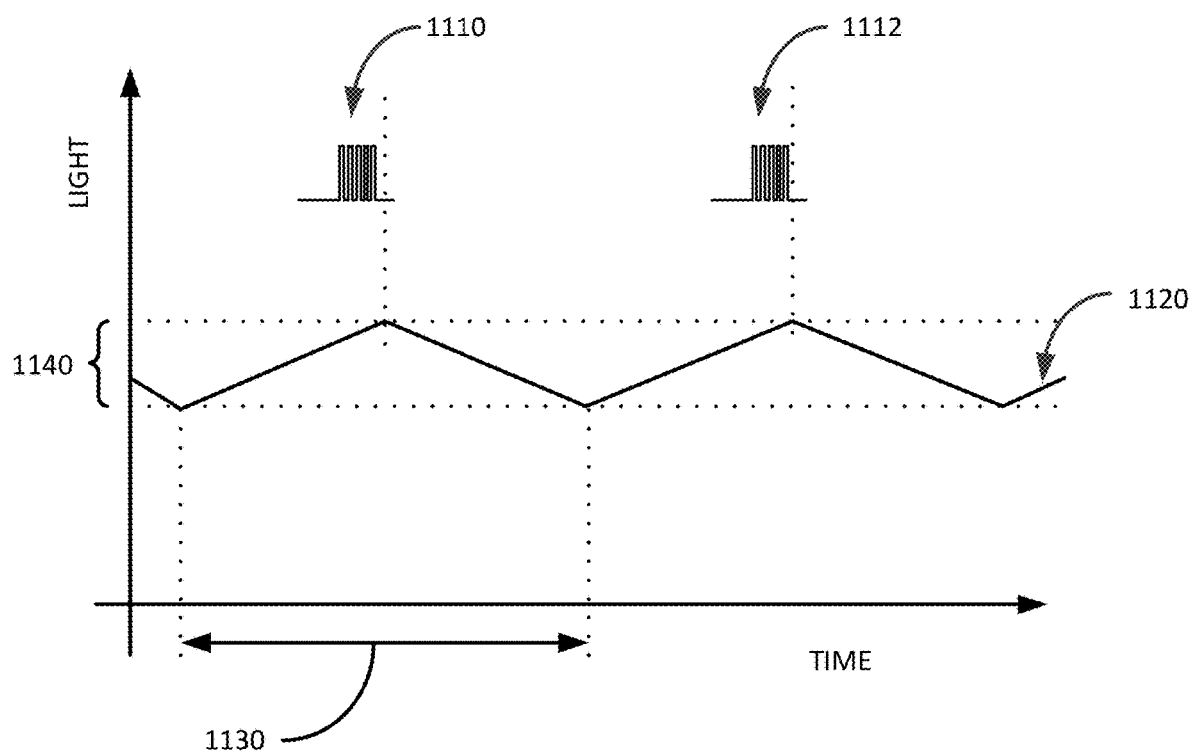
FIG. 11 illustrates an example graphical diagram showing the transmission of the wireless beacon signal and the optical signal, using the luminaires with integrated wireless beacons, in accordance with an example embodiment of the present disclosure.

The luminaire 710 includes a wireless beacon 712, a light engine 714, and a power supply 716, in accordance with an embodiment of the present disclosure. The wireless beacon 712 is configured to transmit a wireless signal (for example as a synchronization pulse) that includes a luminaire identifier to identify the particular luminaire transmitting the optical signal. This may be transmitted at a set interval, for example every 1 second or every 2 seconds. The light engine 714 is configured to transmit an optical signal and is powered by the power supply 716. The light engine 714 may include a controller that is configured to coordinate the timing of the light pulses from the light engine 714 with the synchronization pulse so that the wireless receiver and imaging sensor are able to determine which luminaire sent the wireless signal and optical signal. Refer, for example, to FIG. 11 showing an example synchronization pulse and modulated light pulse. The luminaire 710 may be configured to transmit the wireless signal first and then the pulses of light.

A positioning device 730 is provided in accordance with an embodiment of the present disclosure, which may include any arrangement disclosed herein, including the positioning device within the portable device, the positioning device as separate from the portable device (in which case the wireless receiver 732 and the imaging sensor 734 would not be part of the positioning device, but would instead be separate and would send the wireless signal and the image to the positioning device for processing), and other arrangements will be apparent in light of the present disclosure. The positioning device 730 includes a wireless receiver 732, an imaging sensor 734, a distance meter 736, a pulse detector 738, a luminaire locator 740, a time synchronized combiner 742, a database 744, and a triangulator 746.

The wireless receiver 732 is configured to receive a wireless signal from the wireless beacon of the luminaire 710, which includes a luminaire identifier. The luminaire identifier is used by the distance meter 736 to determine an approximate coarse estimation of the position of the positioning device. The distance meter 736, in an example embodiment, reads out a value from the received signal strength, and translates that into a distance. This may be accomplished, for example, by a lookup table so that the receiver knows the distance based on the received signal strength. The lookup table may be stored in the wireless receiver 732 or sent in the wireless message from the luminaire 710. The distance meter 736 may apply a linear or a quadratic function to correlate the received signal strength (or another signal parameter) to the distance.

The wireless receiver 732 also directly sends the wireless signal to the time synchronized combiner 742. The imaging sensor 734 captures a plurality of images of the optical signal output by the light engine 714. The images are processed by the pulse detector 738 and the luminaire locator 740. The pulse detector 738 determines the amplitude of the pulse to determine appropriate time for synchronization, and the luminaire locator 740 locates luminaires within the images, in accordance with an embodiment of the present disclosure.

The time synchronized combiner 742 synchronizes the incoming data from the wireless receiver 732, the distance meter 736, the pulse detector 738, and the luminaire locator 740 so that it corresponds to a common time. For example, the time synchronized combiner 742 may time stamp or otherwise time synchronize the incoming data so that the appropriately synchronized signals are sent to the triangulator 746. In some instances, the wireless receiver 732 and the imaging sensor 734 may process the signals at different speeds, and thus the signals are synchronized before they are sent to the triangulator 746. In an example embodiment, each of the distance meter 736, the pulse detector 738, and the luminaire locator 740 could each have a buffer with the latest value from the wireless receiver 732 and the imaging sensor 734, and the time synchronized combiner 742 may be configured to retrieve data from the buffer and send it to the triangulator 746.

The wireless receiver 732 is continuously receiving and storing all incoming wireless beacon messages. The imaging sensor 734 monitors the area of interest which corresponds to a particular luminaire. The imaging sensor 734 waits for a synchronization signal transmitted via light from the luminaire 710. Once the sensor has received such a signal, it may identify a wireless beacon message that corresponds (time-wise) to the light signal. Refer, for example, to FIG. 11 showing this time synchronization. The wireless message includes the respective luminaire information.

Methodology—Luminaires with Integrated Wireless Beacons

Figure 8:
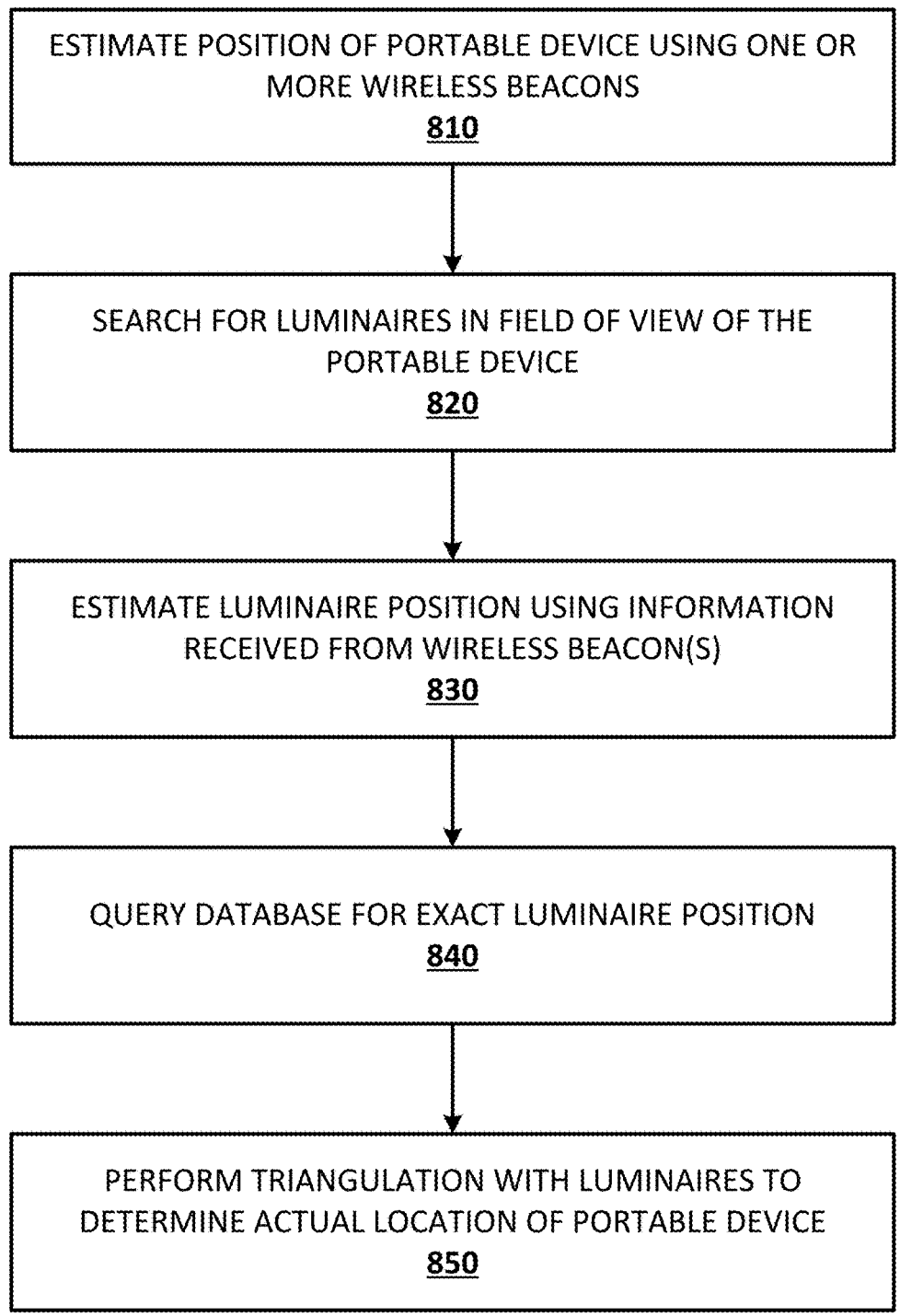
FIG. 8 illustrates a methodology for determining an actual position of a portable device in an environment, using luminaires with integrated wireless beacons, in accordance with an example embodiment of the present disclosure.

FIG. 8 illustrates a methodology for determining an actual position of a portable device in an environment, using luminaires with integrated wireless beacons, in accordance with an embodiment of the present disclosure. At block 810, the position of the portable device is estimated using one or more wireless beacons. At block 820, the luminaires in the field of view of the portable device are located, for example by capturing an image of the field of view of the portable device. The luminaire position is estimated using the information received from the wireless beacons at block 830. The positioning system estimates a first coarse position using wireless beacon triangulation. The database is then queried for the exact position of the luminaire at block 840.

With this first location estimate, the sensor may further query the database for more information which helps improving accuracy in determining the geometric measurements. This information includes the floor level to calculate the precise sensor height in global coordinates. In accordance with these techniques, the sensor position estimation may be improved even when one luminaire is visible to the imaging sensor.

The imaging sensor has a wide field of view to be able to view as many luminaires also possible, for example a 90-degree field of view. The image resolution shall be high enough to ensure a good resolution of the angle measurement. For a desired position accuracy of 10 cm and at a distance of 5 meters from the luminaire, the sensor should be able to measure the azimuth and altitude angles with a resolution of 0.1 degrees. At 90-degrees field of view this translates into 900 pixels, and the overall imaging sensor area would therefore be approximately 1 Megapixel. The imaging sensor is able to locate and segment luminaires because luminaires have a very stark contrast compared to their background (ceiling, for example). At very low exposures, only luminaires remain visible, and all other areas in the image are black or very dark. For the angle measurement, the sensor considers the geometric centers of the luminaires in the image. The translation from pixel coordinates to angles may include a correction for lens distortions. Also, as these angles are relative to the plane of the imaging sensor, they should be transformed to angles with respect to the earth or ground plane. This may be accomplished using sensors on the portable device that measure the orientation of the device relative to the ground or earth, or another global coordinate system.

At 850, a triangulation is performed with the luminaires, using the actual position determined from the database, to determine the actual location of the portable device in the environment.

Figure 9:
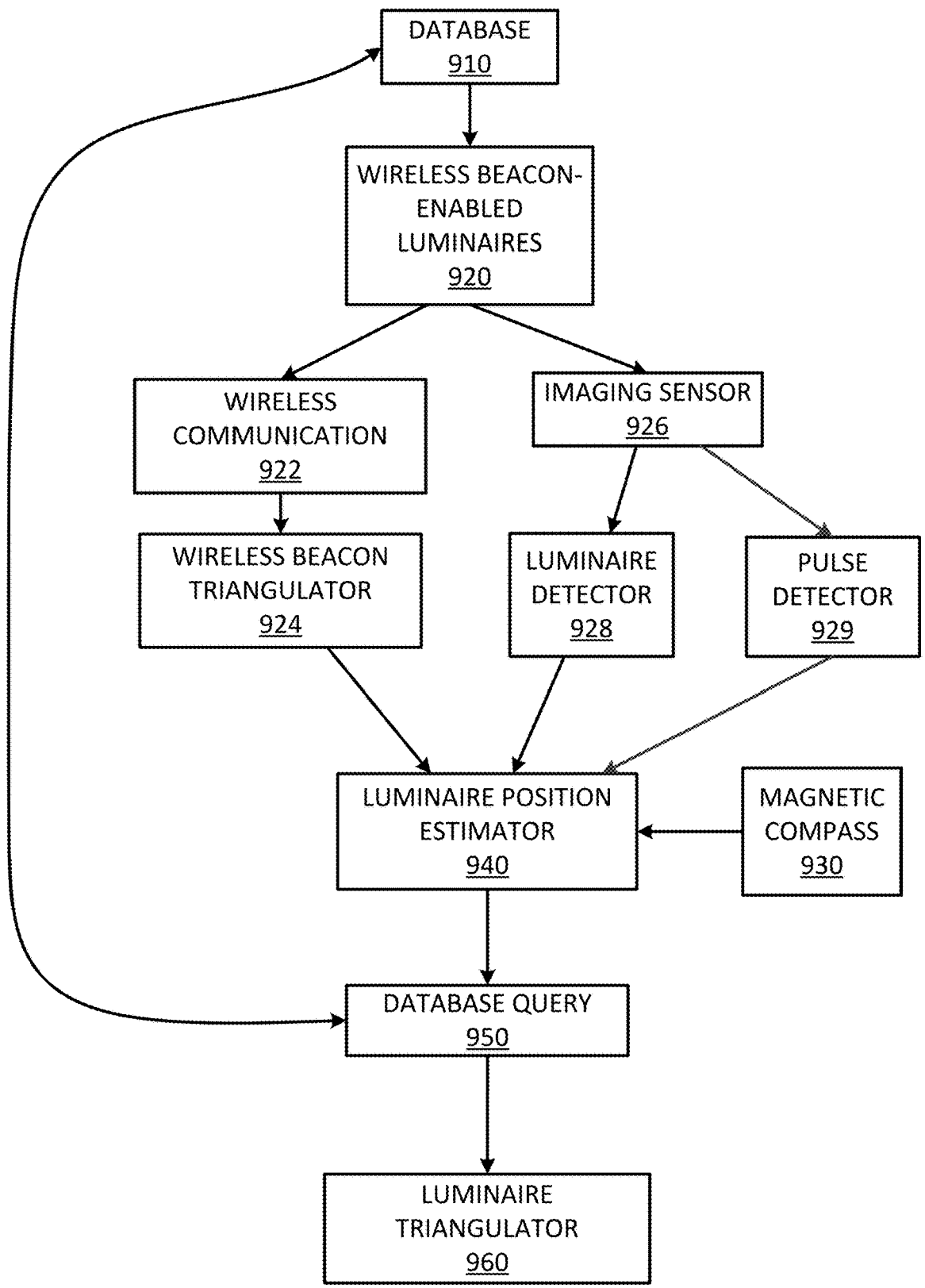
FIG. 9 illustrates a block diagram of a two-tier positioning system methodology, using luminaires with integrated wireless beacons, in accordance with an example embodiment of the present disclosure.

FIG. 9 illustrates a block diagram of a two-tier positioning system methodology, using luminaires with integrated wireless beacons, in accordance with an example embodiment of the present disclosure.

The positioning system includes a plurality of luminaires having integrated wireless beacons, in accordance with an example embodiment of the present disclosure. The flow through the various components of the positioning system is shown in FIG. 9. A database 910 includes information identifying the actual position of the luminaires, and may also include a building map with floor level information, luminaire positions, and other information concerning the environment in which the luminaires and the positioning device is located. The database may further include a list of the luminaire identifiers that provides the accurate position of the luminaire in a table along with the luminaire identifier, the frequency of modulation (if applicable) and other information regarding the environment.

The database 910 includes information concerning the luminaires 920. The luminaires 920 provide their luminaire identifier over wireless communication 922 to the wireless beacon triangulator 924, which sends a coarse position estimate to the luminaire position estimator 940. The luminaire 920 sends a light signal to the imaging sensor 926, which is sent to the luminaire detector 928 to detect the luminaires in the image. The imaging sensor 926 also sends the image to the pulse detector 929 to detect the brightness (or illuminance level) of the luminaire in the image, which is also sent to the luminaire position estimator 940. The image is then sent to the luminaire position estimator 940. A magnetic compass 930 may also provide relative positional data for the positioning device with respect to a global coordinate system. The luminaire position estimator 940 uses the coarse position estimate from the wireless network communication-enabled triangulation and the image, to perform a database query 950 to determine further information. A luminaire triangulator 960 then performs the triangulation using the actual position of the luminaire as queried from the database, to determine the actual position of the portable device, in accordance with an example embodiment of the present disclosure.

Figure 10A:
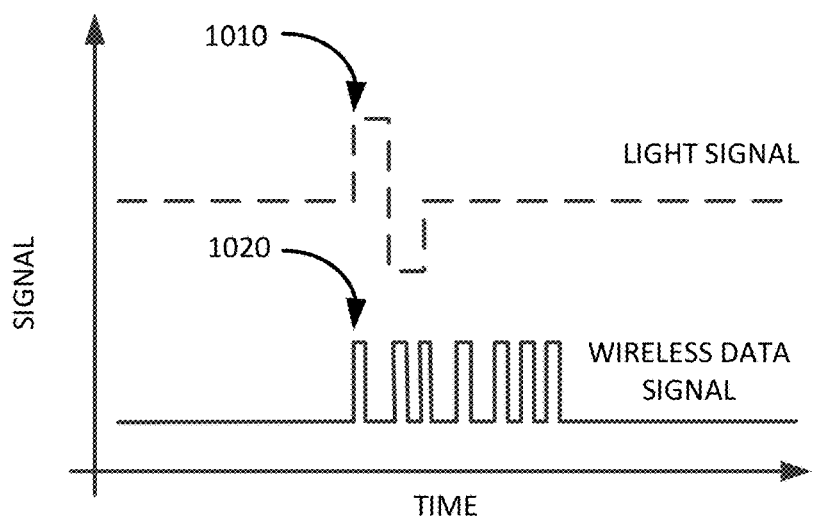
FIGS. 10A-10D illustrate example graphical diagrams showing a luminaire synchronization signal and a wireless transmitter signal as a function of time, using luminaires with integrated wireless beacons, in accordance with an example embodiment of the present disclosure.

Graphical Diagrams/Example Waveforms—Luminaires with Integrated Wireless Beacons FIGS. 10A-10D illustrate example graphical diagrams showing a luminaire synchronization signal and a wireless transmitter signal as a function of time, using luminaires with integrated wireless beacons, in accordance with an example embodiment of the present disclosure. The light signal in this case is a luminaire synchronization signal, and this might be representative of the total luminous flux of the luminaire, or it may represent luminous flux in a certain direction of a particular wavelength in the case of luminaires having multi-channel light-engine features and/or color-steerable, wavelength-steerable, light distribution-steerable, or beam-steerable luminaires. In accordance with an embodiment of the present disclosure, a tunable-white luminaire having warm-white and cold-white LEDs (light emitting diodes) may be operated in such a way that the current through the cold-white LEDs is adjusted so that luminous flux created by these cold-white LEDs corresponds to the luminaire synchronization signal as described herein. At the same time the current of the warm-white LEDs may be adjusted in such a way that the total luminous flux provided by the entire luminaire is constant at any given point in time. The constant luminous flux may minimize potential issues, such as visually perceived disturbance or flicker in any possible application. As shown in FIG. 10A, the luminaire synchronization signal and the wireless beacon signal are time synchronized so that the imaging sensor may identify the luminaire that corresponds to the respective wireless beacon signal and luminaire synchronization signal. Hence this technique allows the positioning device to tie the two signals together, which enables the positioning device to link a luminaire identification number to a specific luminaire even though the modulation of the light from the respective luminaire does not provide this information e.g. allowing for constraints on the luminaire or imaging sensor in the respective implementation. In the example signal, the luminaire's light output is performing a quick up-and-down sequence, with a peak at 1010. The signal should not be noticeable to human eyes, yet be measurable by the imaging sensor. This typically requires a modulation at a speed above 100 Hz.

There are several techniques that may be implemented to synchronize the light signal with the wireless transmitter signal. As shown in FIG. 10A, one technique for synchronizing these two signals is to send the two signals at the same time, so that the peak 1010 of the luminaire synchronization signal is at the same time as the peak 1020, e.g. the beginning for the data packet or digital message sent by the wireless transmitter. The digital message transmitted from the wireless transmitter provides data which may be used to identify the luminaire identifier number.

Figure 10B:
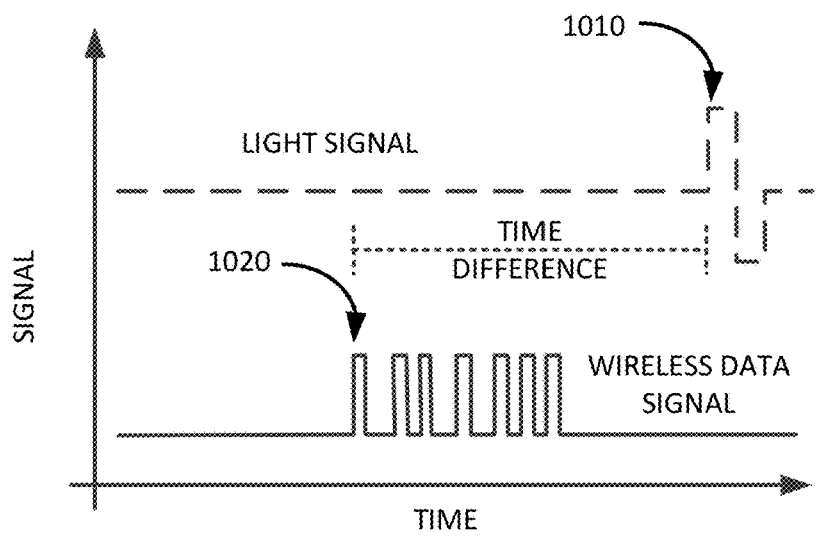

Another technique for synchronizing these two signals is shown in FIG. 10B. As shown in FIG. 10B, the peak 1010 of the luminaire synchronization signal is offset with respect to the peak 1020 of the wireless transmitter signal, in accordance with an embodiment of the present disclosure. In such an offset embodiment, the wireless transmitter signal may identify the specific offset by a predetermined delay or other time difference, so that the time synchronized combiner (for example, combiner 742 in FIG. 7) may use the offset to time synchronize the signals. The digital message transmitted from the wireless transmitter may identify this specified delay and also the luminaire identifier number.

Figure 10C:
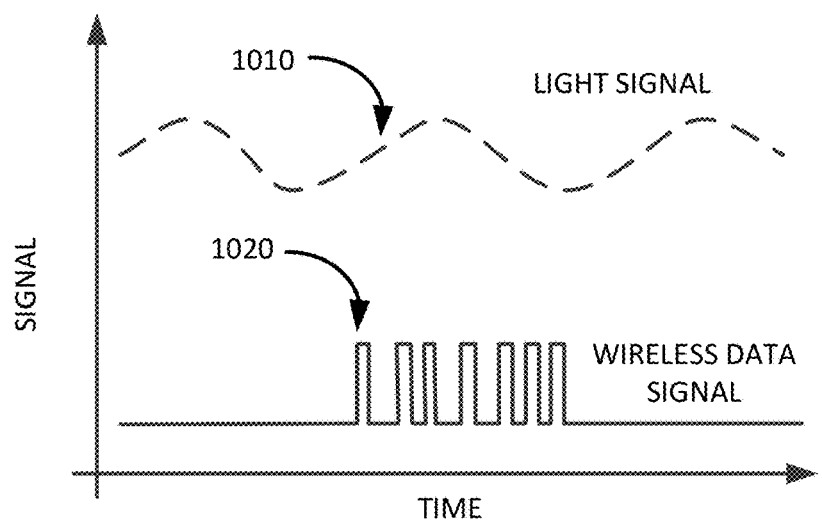

Another technique for the positioning device to tie or link these two signals is shown in FIG. 10C in order to provide different modulation frequencies for different luminaires, and to identify the frequency of modulation in the wireless transmitter signal. Accordingly, a particular light signal may be coordinated with the respective wireless data signal based on the frequency of modulation of the luminaire signal. The digital message transmitted from the wireless beacon of the transmitter may identify the luminaire identifier number and the frequency of modulation. It will be appreciated that the modulation amplitude is small compared to the light amplitude, so that the modulation is not perceivable by the human eye. In some embodiments, the direct current (DC) offset may be blocked in the receiver, for example by a (DC blocking) capacitor, so that the DC offset is blocked out so that the alternating current (AC) portion may be amplified and undergo frequency analysis, as will be appreciated.

Figure 10D:
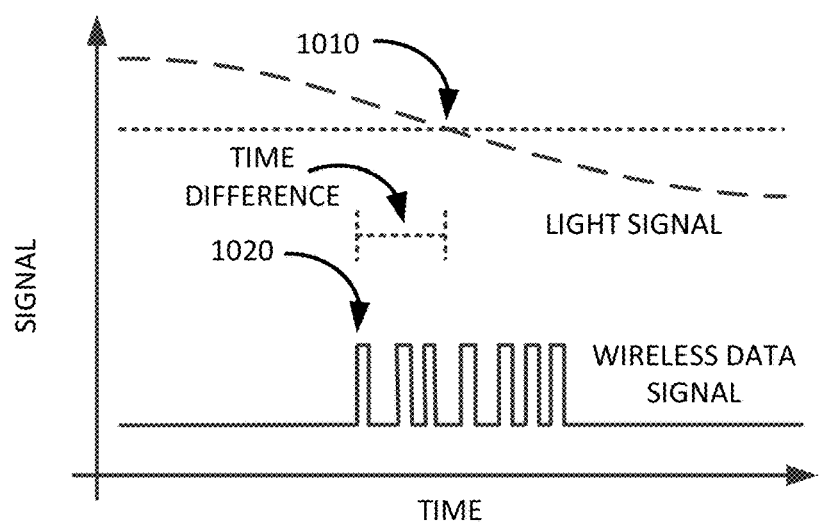

In still another embodiment, as shown in FIG. 10D, the offset technique may be combined with the specific frequency of modulation so that the wireless transmitter signal transmits the specific frequency of modulation of the wireless transmitter, and also includes the offset of the luminaire signal with respect to the wireless transmitter signal, as will be appreciated in light of the present disclosure. In such an embodiment, three parameters may be transmitted as part of the wireless message, including the luminaire identifier number, the frequency of modulation, and the time difference between the wireless signal and the center of zero-crossing of the optical signal. In the embodiment of FIG. 10D, the light modulation is very slow, in this example the entire wireless message is transmitted much faster than one cycle of light modulation of the luminaire. Thus, by using the three parameters (the luminaire identifier, the frequency of modulation and the time difference), the time offset between the wireless signal and the zero-crossing of the light modulation may be used together with the frequency of the light modulation to determine which of a multitude of luminaires potentially in the field of view of the imaging sensor transmitted the appropriate optical signal for determining position of the positioning device or portable device.

FIG. 11 illustrates an example graphical diagram showing the transmission of the wireless beacon signal and the optical signal, using the luminaires with integrated wireless beacons, in accordance with an example embodiment of the present disclosure. As shown, the radio messages 1110, 1112 are transmitted by the luminaire and include the luminaire identifier. The light signal 1120 has a modulation amplitude 1140 that should not be noticeable to the human eye. FIG. 11 shows the modulation of light synchronized to the wireless beacon message. For simplicity, a single luminaire in the field of view is described, however in practice multiple luminaires will be visible, and the teachings are likewise applicable. The imaging sensor is taking images at a predetermined speed (for example, in frames per second), and the exposure is kept constant, in accordance with an example embodiment. The time between two messages 1130, in accordance with an embodiment of the present disclosure, should be fast enough so that the user is able to achieve quick service, but cannot be too fast that it results in radio traffic, in which there are too many beacon messages. The series of images captured by the camera, as shown in FIG. 12, may be for example at a rate of 30 frames per second.

Figure 12:
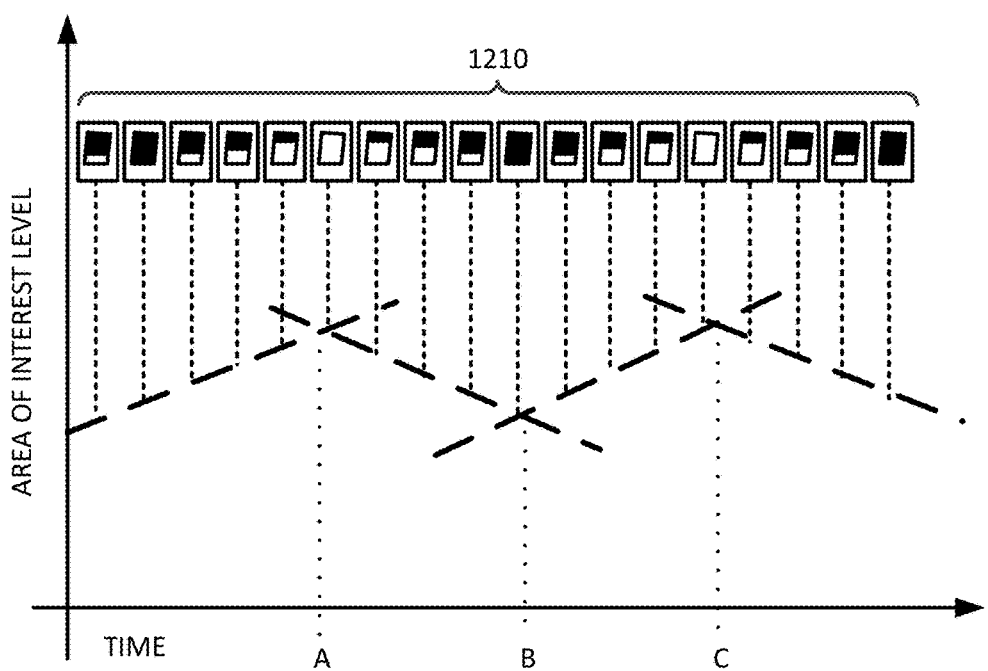
FIG. 12 illustrates an example graphical diagram showing the points in time at which the wireless beacon signal is received, using the luminaires with integrated wireless beacons, in accordance with an example embodiment of the present disclosure.

FIG. 12 illustrates an example graphical diagram showing the points in time when the wireless beacon signal is received, using the luminaires with integrated wireless beacons, in accordance with an example embodiment of the present disclosure. This shows the modulation of light synchronized to the wireless beacon message, and how to determine which message corresponds to which luminaire.

A plurality of image frames 1210 are shown on the graph. The average luminance of the area of interest is computed for every frame. These luminance values are then plotted against time, as shown in FIG. 12. A linear progression is then calculated, and the respective points in time (A, B, C) are the locations at which the linear functions intersect. By calculating a linear progression based on the points on the line, the point at which the lines intersect identifies the maximum point of intensity, and thus the peak of the luminaire synchronization signal. This also accounts for any noise that may result by providing a linear progression of the points, and improves accuracy by providing an average rather than the absolute points. By continuing these measurements over multiple periods, allows the accuracy with which points in time may be determined to be improved. Given that the signal is periodic, a phase lock loop algorithm could be applied to further improve the accuracy over time.

In an embodiment in which multiple wireless beacon messages fall in the time window around the above determined point in time, the relative signal strength of radio messages may be used as additional criterion to correlate a wireless beacon message with a particular luminaire, by choosing the message with the highest received signal strength indicator.

In an embodiment in which multiple optical signals fall in the time window around the same point in time, the transmitters of the luminaires may be configured to modulate at slightly different frequencies, and the integrated wireless beacons may be configured to transmit the luminaire identifier as well as the frequency of modulation, so that the positioning system has more information to identify a particular luminaire that is transmitting a wireless signal and an optical signal, to thereby increase accuracy in determining location of an object in an environment.

The position of the portable devices may accurately be determined in accordance with the two-tier triangulation approach disclosed herein.

Advantages of systems according to some embodiments of the present disclosure should be apparent in light of this disclosure. For instance, possible advantages of some embodiments include operation with sensors and luminaires that do not require modulation of light signals or decoding of visible light communication. Another possible advantage is the ability to locate a portable device even when one or two luminaires are visible in the field of view of the portable device, by still performing triangulation using data obtained in a first wireless beacon-enabled triangulation. When the wireless beacon is collocated with the luminaire, the signal strength indicator may be used to measure the distance to the luminaire, which allows the position to be estimated using a single luminaire. This may be particularly advantageous in spaces with sparsely scattered luminaires. Note that not all embodiments of the present disclosure require any or all of these various advantages, and numerous configurations and variations will be apparent in light of this disclosure.

Numerous variations and configurations will be apparent in light of the disclosure. For example, one example embodiment of the present disclosure provides a method for determining an actual position of a portable device in an environment using one or more luminaires and one or more wireless beacons. The method includes receiving a wireless signal from a wireless beacon, performing, by a processor, a first triangulation using a signal parameter of the wireless signal, determining, by the processor, an estimated position of the portable device in the environment using the first triangulation, receiving an image of a field of view of an imaging sensor, in which the one or more luminaires are within the field of view, determining, by the processor, an estimated position of each of the one or more luminaires in the field of view using the image captured by the imaging sensor, querying a database, by the processor, to identify an actual position of each of the one or more luminaires using the estimated positions of the one or more luminaires and the estimated position of the portable device, and performing, by the processor, a second triangulation using the actual position of the one or more luminaires from the database to determine the actual position of the portable device.

In some embodiments, the method further includes receiving a building map of the environment, the building map including the actual position of the one or more luminaires, and storing, by the processor, the building map in a memory coupled to the processor. In some embodiments, the signal parameter of the wireless signal is at least one of: a received signal strength indicator, an angle of arrival, and a Time of Flight. In some embodiments, the method further includes receiving a coarse orientation of the portable device from a positional sensor of the portable device, and using the coarse orientation to determine the actual position of the portable device in the environment. In some embodiments, the method further includes querying the database for the one or more luminaires in the field of view of the portable device, and varying a position estimation of the one or more luminaires until the field of view matches an image rendered from the position estimation.

Additional implementations disclosed herein include a portable device that includes an image sensor and a processor coupled to the image sensor. The processor is configured to receive a wireless signal from a wireless beacon, perform a first triangulation using a signal parameter of the wireless signal, determine an estimated position of the portable device in the environment using the first triangulation, receive an image of a field of view of the imaging sensor, in which one or more luminaires are within the field of view, determine an estimated position of each of the one or more luminaires in the field of view using the image captured by the imaging sensor, query a database to identify an actual position of each of the one or more luminaires using the estimated positions of the one or more luminaires and the estimated position of the portable device, and perform a second triangulation using the actual position of the one or more luminaires from the database to determine the actual position of the portable device.

In some embodiments, the processor is further configured to receive a building map of the environment, the building map including the actual position of the one or more luminaires, and store the building map in a memory coupled to the processor. In some embodiments, the signal parameter of the wireless signal is at least one of: a received signal strength indicator, an angle of arrival, and a Time of Flight. In some embodiments, the portable device further includes a positional sensor and the processor is further configured to receive a coarse orientation of the portable device from the positional sensor, and use the coarse orientation to determine the actual position of the portable device in the environment. In some embodiments, the database is stored on a server and the portable device is communicatively coupled to the server.

Additional implementations disclosed herein include a method for determining an actual position of a portable device in an environment using one or more luminaires having an integrated wireless beacon. The method includes receiving, from the integrated wireless beacon of each of the one or more luminaires, a wireless signal that includes an identifier number that identifies each of the one or more luminaires, determining, by a processor, an estimated position of the portable device using the identifier numbers of each of the one or more luminaires, receiving an image of a field of view of an imaging sensor, in which the one or more luminaires are within the field of view, determining, by the processor, an estimated position of the one or more luminaires using the image captured by the imaging sensor, querying a database, by the processor, to identify an actual position of the one or more luminaires using the estimated position of the one or more luminaires and the estimated position of the portable device, and performing, by the processor, a second triangulation using the actual position of the one or more luminaires from the database to determine the actual position of the portable device.

In some embodiments, the method further includes receiving a coarse orientation of the portable device from a magnetic compass of the portable device, and using the coarse orientation to determine the actual position of the portable device in the environment. In some embodiments, the integrated wireless beacon is at least one of: a radio frequency beacon, a wireless network access point, and a Bluetooth beacon. In some embodiments, the method further includes receiving a building map of the environment, the building map including the actual position of the one or more luminaires, and storing, by the processor, the building map in a memory coupled to the processor.

Additional implementations disclosed herein include a system that includes a first luminaire having an integrated wireless beacon and an optical transmitter, the integrated wireless beacon configured to transmit a wireless signal, and the optical transmitter configured to transmit an optical signal, the wireless signal configured to include an identifier number that identifies the first luminaire in an environment, and a positioning device having a wireless receiver and an imaging sensor, the wireless receiver configured to receive the wireless signal from the integrated wireless beacon of the first luminaire, and the imaging sensor configured to receive the optical signal from the optical transmitter of the first luminaire and to capture an image of a field of view of the imaging sensor, in which the positioning device is configured to determine an actual position of a portable device within the environment using the identifier number from the wireless signal, the optical signal, and the image.

In some embodiments, the integrated wireless beacon is at least one of: a radio frequency beacon, a wireless network access point, and a Bluetooth beacon. In some embodiments, the system further includes a server storing a database having a building map stored thereon, the building map including a position of each luminaire in the environment including the first luminaire. In some embodiments, the positioning device is within the portable device, the portable device being at least one of: a cell phone, a smart phone, a laptop, and a tablet. In some embodiments, the positioning device further includes an orientation sensor that is configured to track motion of the portable device to determine a coarse orientation of the portable device.

Additional implementations disclosed herein include a computer program product including one or more non-transitory machine readable mediums encoded with instructions that when executed by one or more processors cause a process to be carried out for determining an actual position of a portable device in an environment, using one or more luminaires and one or more wireless beacons. The process includes receiving a wireless signal from a wireless beacon, performing a first triangulation using a signal parameter of the wireless signal, determining an estimated position of the portable device in the environment using the first triangulation, receiving an image of a field of view of an imaging sensor, in which the one or more luminaires are within the field of view, determining an estimated position of each of the one or more luminaires in the field of view using the image captured by the imaging sensor and the estimated position of the portable device, querying a database to identify an actual position of each of the one or more luminaires using the estimated positions of the one or more luminaires, and performing a second triangulation using the actual position of the one or more luminaires from the database to determine the actual position of the portable device. The one or more non-transitory machine readable mediums may be any physical memory device, such as one or more computer hard-drives, servers, solid state drives, ROM, RAM, registers, compact discs, thumb drives, magnetic tape, or any other suitable non-transitory or physical storage technology.

In some embodiments, the process further includes receiving a building map of the environment, the building map including the actual position of the one or more luminaires, and storing the building map in a memory coupled to the processor. In some embodiments, the signal parameter of the wireless signal is at least one of: a received signal strength indicator, an angle of arrival, and a Time of Flight. In some embodiments, the process further includes receiving a coarse orientation of the portable device from a positional sensor of the portable device, and using the coarse orientation to determine the actual position of the portable device in the environment. In some embodiments, the process further includes querying the database for the one or more luminaires in the field of view of the portable device, and varying a position estimation of the one or more luminaires until the field of view matches an image rendered from the position estimation.

Additional implementations disclosed herein include a computer program product including one or more non-transitory machine readable mediums encoded with instructions that when executed by one or more processors cause a process to be carried out for determining an actual position of a portable device in an environment using one or more luminaires having an integrated wireless beacon. The process includes receiving, from the integrated wireless beacon of each of the one or more luminaires, a wireless signal that includes an identifier number that identifies each of the one or more luminaires, determining an estimated position of the portable device using the identifier numbers of each of the one or more luminaires, receiving an image of a field of view of an imaging sensor, in which the one or more luminaires are within the field of view, determining an estimated position of the one or more luminaires using the image captured by the imaging sensor and the estimated position of the portable device, querying a database to identify an actual position of the one or more luminaires using the estimated position of the one or more luminaires, and performing a second triangulation using the actual position of the one or more luminaires from the database to determine the actual position of the portable device. The previous disclosure with respect to the non-transitory machine readable medium(s) is equally applicable here.

In some embodiments, the process further includes receiving a coarse orientation of the portable device from a magnetic compass of the portable device, and using the coarse orientation to determine the actual position of the portable device in the environment. In some embodiments, the integrated wireless beacon is at least one of: a radio frequency beacon, a wireless network access point, and a Bluetooth beacon. In some embodiments, the process further includes receiving a building map of the environment, the building map including the actual position of the one or more luminaires, and storing the building map in a memory coupled to the processor.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A method for determining an actual position of a portable device in an environment using one or more luminaires and one or more wireless beacons, the method comprising:
   receiving a wireless signal from a wireless beacon;
   performing, by a processor, a first triangulation using a signal parameter of the wireless signal;
   determining, by the processor, an estimated position of the portable device in the environment using the first triangulation;
   receiving an image of a field of view of an imaging sensor, wherein the one or more luminaires are within the field of view;
   determining, by the processor, an estimated position of each of the one or more luminaires in the field of view using the image captured by the imaging sensor;
   querying a database, by the processor, to identify an actual position of each of the one or more luminaires using information consisting of the estimated positions of the one or more luminaires and the estimated position of the portable device; and
   performing, by the processor, a second triangulation using the actual position of the one or more luminaires from the database to determine the actual position of the portable device.

2. The method of claim 1, further comprising:
   receiving a building map of the environment, the building map including the actual position of the one or more luminaires; and
   storing, by the processor, the building map in a memory coupled to the processor.

3. The method of claim 1, wherein the signal parameter of the wireless signal is at least one of: a received signal strength indicator, an angle of arrival, and a Time of Flight.

4. The method of claim 1, further comprising:
   receiving a coarse orientation of the portable device from a positional sensor of the portable device; and
   using the coarse orientation to determine the actual position of the portable device in the environment.

5. The method of claim 1, further comprising:
   querying the database for the one or more luminaires in the field of view of the portable device; and
   varying a position estimation of the one or more luminaires until the field of view matches an image rendered from the position estimation.

6. A portable device, comprising:
   an image sensor; and
   a processor coupled to the image sensor and configured to:
   receive a wireless signal from a wireless beacon;

perform a first triangulation using a signal parameter of the wireless signal;

determine an estimated position of the portable device in the environment using the first triangulation;

receive an image of a field of view of the imaging sensor, wherein one or more luminaires are within the field of view;

determine an estimated position of each of the one or more luminaires in the field of view using the image captured by the imaging sensor;

query a database to identify an actual position of each of the one or more luminaires using information consisting of the estimated positions of the one or more luminaires and the estimated position of the portable device; and perform a second triangulation using the actual position of the one or more luminaires from the database to determine the actual position of the portable device.

7. The device of claim 6, wherein the processor is further configured to:

receive a building map of the environment, the building map including the actual position of the one or more luminaires; and store the building map in a memory coupled to the processor.

8. The device of claim 6, wherein the signal parameter of the wireless signal is at least one of: a received signal strength indicator, an angle of arrival, and a Time of Flight.

9. The device of claim 6, wherein the portable device further comprises a positional sensor and the processor is further configured to:

receive a coarse orientation of the portable device from the positional sensor; and use the coarse orientation to determine the actual position of the portable device in the environment.

10. The device of claim 6, wherein the database is stored on a server and the portable device is communicatively coupled to the server.

11. A method for determining an actual position of a portable device in an environment using one or more luminaires having an integrated wireless beacon, the method comprising:

receiving, from the integrated wireless beacon of each of the one or more luminaires, a wireless signal that includes an identifier number that identifies each of the one or more luminaires;

determining, by a processor, an estimated position of the portable device using the identifier numbers of each of the one or more luminaires;

receiving an image of a field of view of an imaging sensor, wherein the one or more luminaires are within the field of view;

determining, by the processor, an estimated position of the one or more luminaires using the image captured by the imaging sensor;

querying a database, by the processor, to identify an actual position of the one or more luminaires using information consisting of the estimated position of the one or more luminaires and the estimated position of the portable device; and performing, by the processor, a triangulation using the actual position of the one or more luminaires from the database to determine the actual position of the portable device.

12. The method of claim 11, further comprising:

receiving a coarse orientation of the portable device from a magnetic compass of the portable device; and using the coarse orientation to determine the actual position of the portable device in the environment.

13. The method of claim 11, wherein the integrated wireless beacon is at least one of: a radio frequency beacon, a wireless network access point, and a Bluetooth beacon.

14. The method of claim 11, further comprising:

receiving a building map of the environment, the building map including the actual position of the one or more luminaires; and storing, by the processor, the building map in a memory coupled to the processor.

15. A system comprising:

a first luminaire having an integrated wireless beacon and an optical transmitter, the integrated wireless beacon configured to transmit a wireless signal, and the optical transmitter configured to transmit an optical signal, the wireless signal configured to include an identifier number that identifies the first luminaire in an environment; and a positioning device having a wireless receiver and an imaging sensor, the wireless receiver configured to receive the wireless signal from the integrated wireless beacon of the first luminaire, and the imaging sensor configured to receive the optical signal from the optical transmitter of the first luminaire and to capture an image of a field of view of the imaging sensor;

wherein the positioning device is configured to:

determine an estimated position of the positioning device using the identifier number of each of the first luminaire;

determine an estimated position of the first luminaire using the image captured by the imaging sensor;

query a database to identify an actual position of the first luminaire using information consisting of the estimated position of the first luminaire and the estimated position of the positioning device; and determine an actual position of positioning device within the environment by a triangulation using the actual position of the first luminaire.

16. The system of claim 15, wherein the integrated wireless beacon is at least one of: a radio frequency beacon, a wireless network access point, and a Bluetooth beacon.

17. The system of claim 15, further comprising:

a server storing the database having a building map stored thereon, the building map including a position of each luminaire in the environment including the first luminaire.

18. The system of claim 15, wherein the positioning device is within the portable device, the portable device being at least one of: a cell phone, a smart phone, a laptop, and a tablet.

19. The system of claim 18, wherein the positioning device further comprises an orientation sensor that is configured to track motion of the portable device to determine a coarse orientation of the portable device.

* * * * *